(12) United States Patent
Aguilar Achiaga et al.

(10) Patent No.: US 11,961,156 B2
(45) Date of Patent: Apr. 16, 2024

(54) UTILIZING SIMILARITY, KNOWLEDGE GRAPHS, AND MACHINE LEARNING MODELS TO REFINE/REDEFINE A TARGET SKILL PROFILE BASED ON SKILLS DATA FROM EMPLOYEES OF AN ENTITY AND ACTIVATE A RECOMMENDATION SYSTEM

(71) Applicant: Accenture Global Solutions Limited, Dublin (IE)

(72) Inventors: Marta Aguilar Achiaga, Madrid (ES); Salvador Villora Gallardo, Madrid (ES); Arlind Nocaj, Tettnang (DE); Maria Concepcion Revilla Velasco, Madrid (ES)

(73) Assignee: Accenture Global Solutions Limited, Dublin (IE)

( * ) Notice: Subject to any disclaimer, the term of this patent is extended or adjusted under 35 U.S.C. 154(b) by 177 days.

(21) Appl. No.: 16/946,951

(22) Filed: Jul. 13, 2020

(65) Prior Publication Data
US 2021/0358065 A1   Nov. 18, 2021

(30) Foreign Application Priority Data
May 13, 2020   (EP) ..................................... 20382397

(51) Int. Cl.
*G06Q 50/20*   (2012.01)
*G06F 16/28*   (2019.01)
(Continued)

(52) U.S. Cl.
CPC ....... *G06Q 50/2057* (2013.01); *G06F 16/285* (2019.01); *G06Q 10/063112* (2013.01); *G06Q 10/0639* (2013.01); *G06Q 10/105* (2013.01)

(58) Field of Classification Search
CPC ....... G06Q 50/2057; G06Q 10/063112; G06Q 10/0639; G06Q 10/105; G06F 16/285; G06N 5/04; G09B 19/00
See application file for complete search history.

(56) References Cited

U.S. PATENT DOCUMENTS 10,102,281 B2 * 10/2018 Williams .............. G06F 16/345
2003/0182178 A1   9/2003 D'Elena et al.
(Continued)

OTHER PUBLICATIONS

A smart local moving algorithm for large-scale modularity-based community detection; Waltman et al.; Nov. 13, 2013 (Year: 2013).*
(Continued)

*Primary Examiner* — Deirdre D Hatcher
(74) *Attorney, Agent, or Firm* — Harrity & Harrity, LLP

(57) ABSTRACT

A device may receive employee data associated with an employee, and may determine, from the employee data, skill data identifying skills of the employee. The device may process the employee data and the skill data, with a similarity model, to determine similarity scores between the skills of the skill data, and may add or remove one or more skills to or from the skill data for predefined target skill profile categories to generate modified skill data. The device may compare the similarity scores and a predefined threshold to determine anchor skill data from the modified skill data, and may group the anchor skill data for corresponding pluralities of the predefined target skill profile categories to generate groups of the anchor skill data. The device may process the groups and the similarity scores, with a clustering model, to generate clustered anchor skill data, and may perform actions based on the clustered anchor skill data.

20 Claims, 20 Drawing Sheets

(51) Int. Cl.
  *G06Q 10/0631* (2023.01)
  *G06Q 10/0639* (2023.01)
  *G06Q 10/105* (2023.01)

(56) References Cited

U.S. PATENT DOCUMENTS

| | | |
|---|---|---|
| 2015/0248645 A1 | 9/2015 | Rao et al. |
| 2016/0147767 A1* | 5/2016 | Manning ............... G06F 16/951 715/716 |
| 2017/0061550 A1* | 3/2017 | Lin ........................ G06Q 50/01 |
| 2017/0154311 A1* | 6/2017 | Lewis ................ G06Q 10/1053 |
| 2017/0308811 A1 | 10/2017 | Kumar |
| 2017/0308841 A1* | 10/2017 | Swaminathan ........ G06N 5/022 |
| 2018/0253655 A1* | 9/2018 | Wang ..................... G06Q 50/01 |
| 2020/0034776 A1* | 1/2020 | Peran .................... G06N 5/022 |
| 2020/0065769 A1* | 2/2020 | Gupta ............... G06F 16/90332 |

OTHER PUBLICATIONS

Improving performances of Top-N recommendations with co-clustering method; Feng et al.; Nov. 2019 (Year: 2019).*

Jesus Barrasa, "QuickGraph#5 Learning a taxonomy from your tagged data," Graph-Backed Thoughts, Mar. 31, 2017, 11 Pages, Website: https://jbarrasa.com/2017/03/31/quickgraph5-learning-a-taxonomy-from-your-tagged-data.

Antonio Andrea Gentile, "Competency Management: a matter of filtering and recommendation engines," GraphGist, Nov. 27, 2015 16 Pages; Website: https://neo4j.com/graphgist/competency-management-a-matter-of-filtering-and-recommendation-engines#listing_category=real-time-recommendations.

Extended European Search Report for Application No. EP20382397.6, dated Oct. 13, 2020, 8 pages.

* cited by examiner

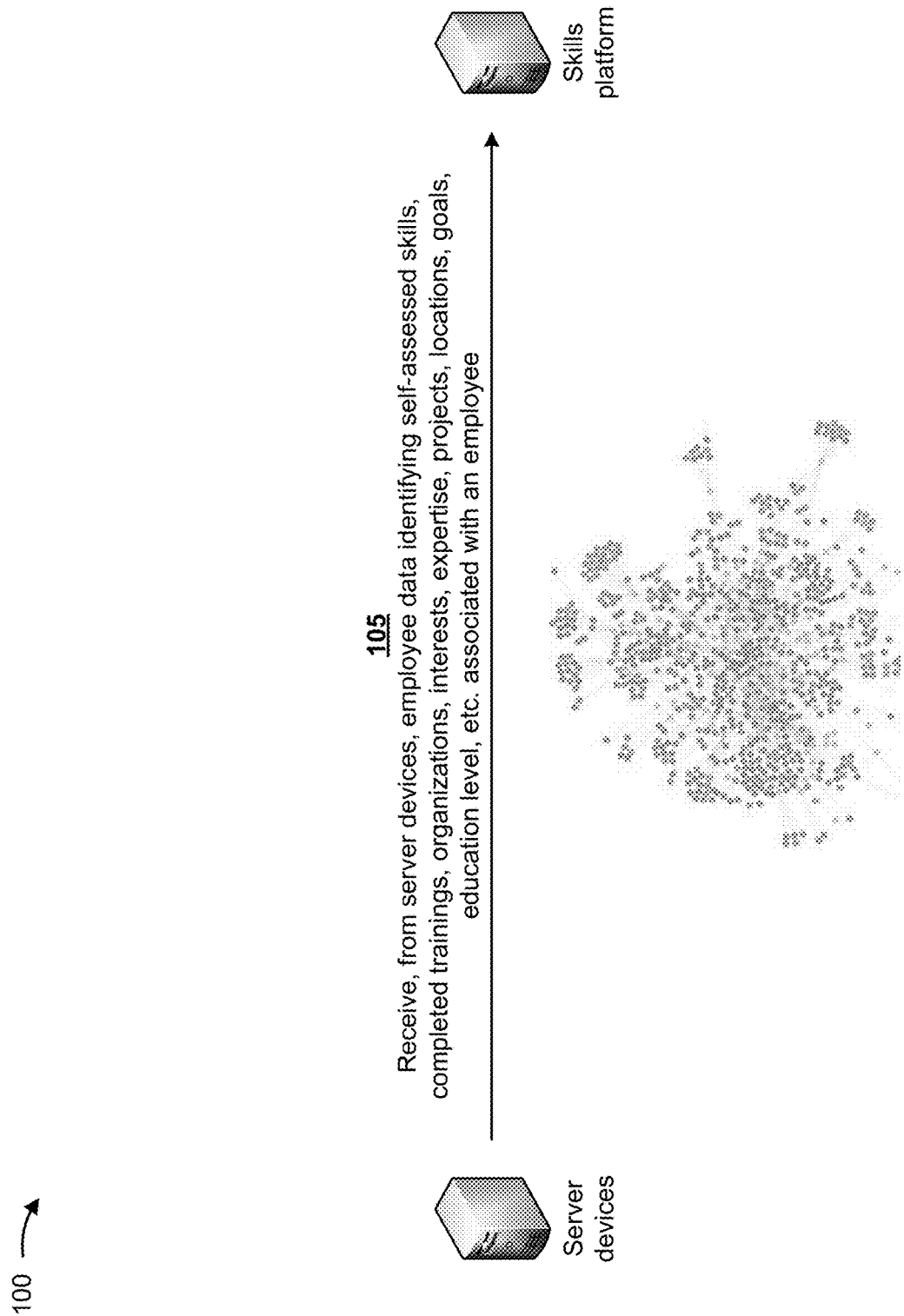

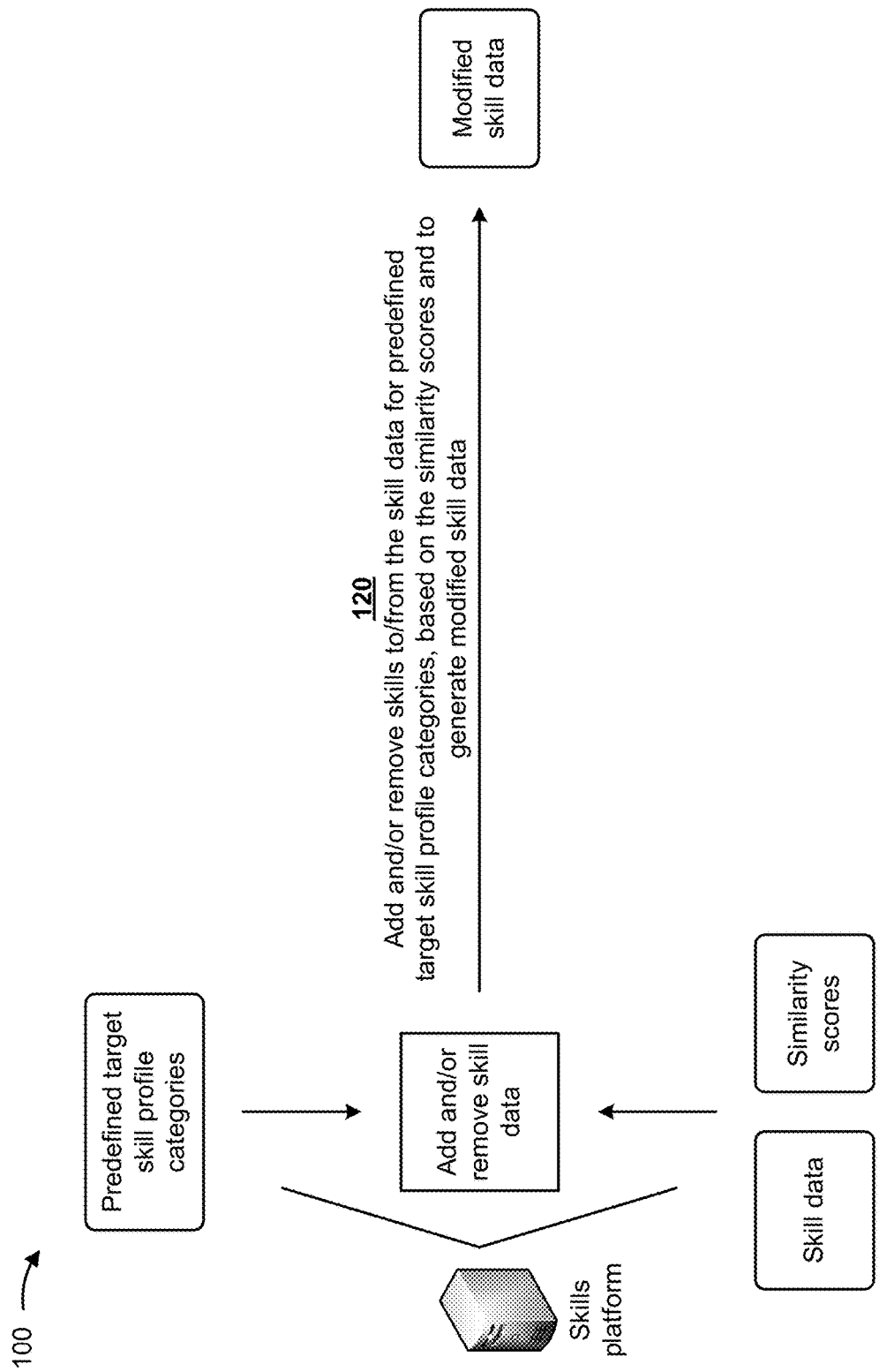

Case 1 - Refine the target skill profile

1. Skills in the target skill profile (seeds)

skill
    On Premise Human Capital Management
    Organizational Management
    Personnel Administration
    Travel & Expense
    Travel & Expense Integration 2. New seeds iteration 1
| skill | related skills | total similarity | (additional seed) |
|---|---|---|---|
| Time Management | 5 | 1.44 | |
| Compensation Management | 5 | 1.33 | |
| Process Forms | 5 | 0.83 | |

Iteration 2
| skill | related skills | total similarity | (additional seed) |
|---|---|---|---|
| Compensation Management | 6 | 1.58 | |
| Process Forms | 6 | 0.98 | |

FIG. 1J

Case 1 - Refine the target skill profile

3. Anchor for target skill profile

| skill | seed | total similarity | anchor | weight in spec | anchor reviewed |
|---|---|---|---|---|---|
| Organizational Management | seed | 3.36 | anchor | 4.04 | anchor |
| Personnel Administration | seed | 3.32 | anchor | 3.98 | anchor |
| On Premise Human Capital Mgt | seed | 2.92 | anchor | 3.50 | anchor |
| Time Management | new | 2.69 | anchor | 3.76 | anchor |
| Payroll | | 2.61 | anchor | 3.14 | anchor |
| Compensation Management | new | 2.58 | anchor | 3.62 | anchor |
| Benefits Management | | 2.17 | anchor | 2.60 | anchor |
| Performance Management | | 1.94 | anchor | 1.94 | anchor |
| Training Event Management | | 1.69 | anchor | 1.69 | anchor |
| Travel & Expense | seed | 1.57 | anchor | 1.26 | anchor |
| Recruiting | | 1.55 | anchor | 1.86 | anchor |
| Learning | | 1.54 | anchor | 1.85 | anchor |
| Succession Planning | | 1.41 | anchor | 1.41 | anchor |
| Factors Employee Central | | 1.33 | anchor | 1.60 | proximity (not kept as anchor) |
| Cloud Platform Extensions | | 1.30 | anchor | 1.30 | proximity (not kept as anchor) |
| Travel & Expense Integration | seed | 1.26 | anchor | 0.51 | anchor |
| Process Forms | | 1.16 | anchor | 1.63 | anchor |
| Compensation | | 1.02 | proximity | 1.23 | proximity |
| Performance Goals | | 0.90 | proximity | 0.90 | proximity |
| Recruiting | | 0.67 | proximity | 0.53 | proximity |
| On Premise ABAP | | 0.60 | proximity | 0.36 | proximity |
| Cloud for Travel & Expense | | 0.32 | proximity | 0.13 | proximity |
| Reporting | | 0.30 | proximity | 0.12 | proximity |

4. Anchor review across target skill profile

| target skill profile | skills in spec | skill | related | similarity | anchor | weight in spec | anchor reviewed |
|---|---|---|---|---|---|---|---|
| Core HR | 5 | Central 6 | 1.33 | anchor | 1.60 | proximity |
| Central | 3 | Central 5 | 1.95 | anchor | 3.25 | anchor (kept as anchor) |
| Recruiting | 3 | Central 4 | 0.82 | anchor | 1.10 | proximity |

FIG. 1K

Case 1 – Refine the target skill profile
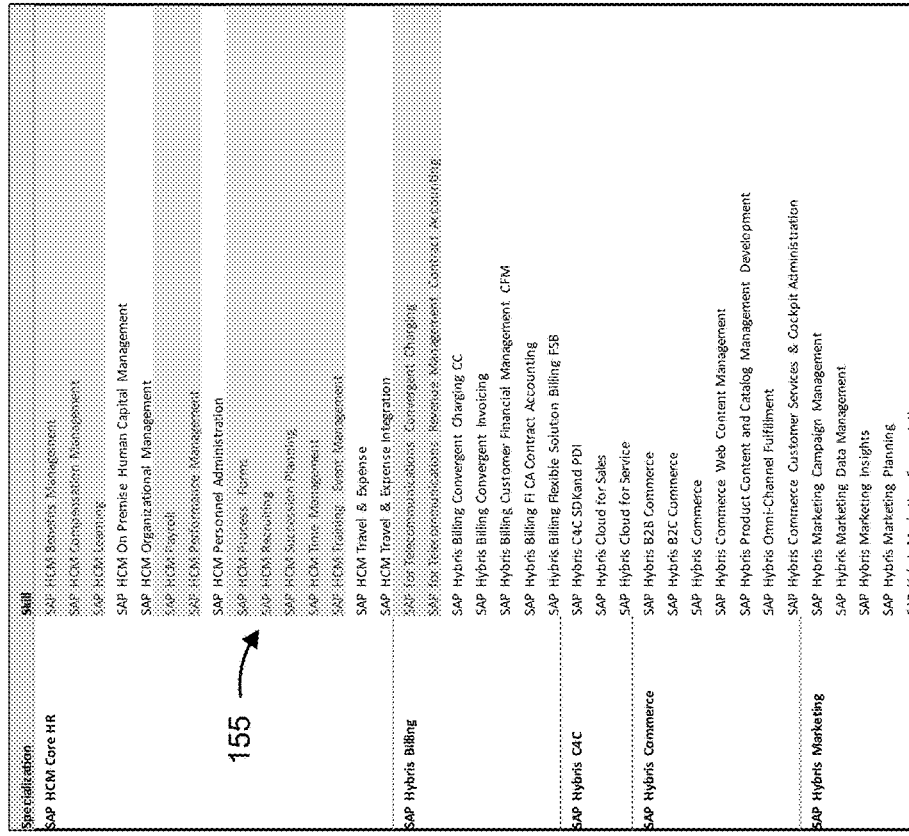
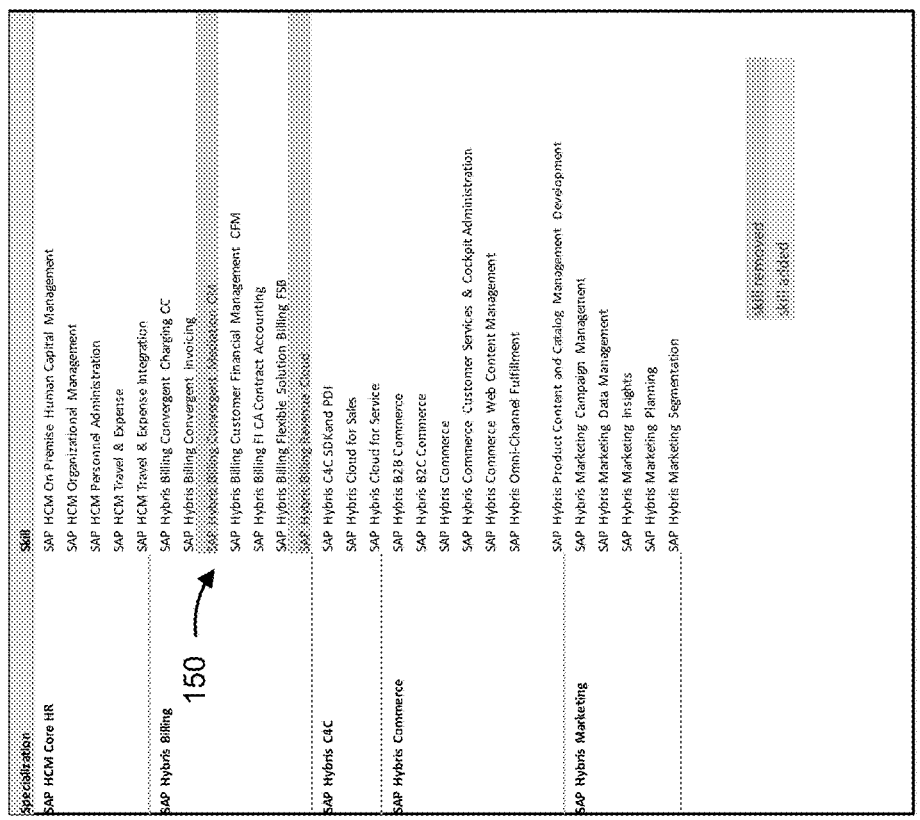
FIG. 1L

UTILIZING SIMILARITY, KNOWLEDGE GRAPHS, AND MACHINE LEARNING MODELS TO REFINE/REDEFINE A TARGET SKILL PROFILE BASED ON SKILLS DATA FROM EMPLOYEES OF AN ENTITY AND ACTIVATE A RECOMMENDATION SYSTEM

CROSS-REFERENCE TO RELATED APPLICATION

This application claims priority to European Provisional Application No. 20382397.6 entitled "UTILIZING SIMILARITY AND MACHINE LEARNING MODELS TO DETERMINE RECOMMENDED SKILLS TO ACQUIRE FOR AN EMPLOYEE OF AN ENTITY," filed on May 13, 2020. The entire content of which is expressly incorporated herein by reference.

BACKGROUND

Today, companies are struggling to attract, retain, and train competent employees. Artificial intelligence, digital transformation, constantly changing technology, and/or the like require constant visibility of employee knowledge and talent.

SUMMARY

According to some implementations, a method may include obtaining skill data identifying skills of one or more employees, and processing the skill data, with a similarity model, to determine similarity scores between the skills of the skill data. The method may include adding or removing one or more skills to or from the skill data for one or more predefined target skill profile categories, based on the similarity scores and to generate modified skill data. The method may include comparing the similarity scores and a predefined threshold to determine anchor skill data from the modified skill data and for each of the predefined target skill profile categories, and grouping the anchor skill data for corresponding pluralities of the predefined target skill profile categories, based on one or more predefined group categories and to generate groups of the anchor skill data. The method may include processing the groups of the anchor skill data and the similarity scores, with a clustering model, to generate clustered anchor skill data for each of the one or more predefined group categories, and performing one or more actions based on the clustered anchor skill data.

According to some implementations, a device may include one or more memories and one or more processors to receive employee data identifying self-assessed skills, completed trainings, organizations, interests, expertise, or an education level associated with an employee, and determine, from the employee data, skill data identifying skills of the employee. The one or more processors may process the employee data and the skill data, with a similarity model, to determine similarity scores between the skills of the skill data based on the employee data, and may add or remove one or more skills to or from the skill data for predefined target skill profile categories, based on the similarity scores and to generate modified skill data. The one or more processors may compare the similarity scores and a predefined threshold to determine anchor skill data from the modified skill data and for each of the predefined target skill profile categories, and may group the anchor skill data for corresponding pluralities of the predefined target skill profile categories, based on a predefined group category and to generate groups of the anchor skill data. The one or more processors may process the groups of the anchor skill data and the similarity scores, with a clustering model, to generate clustered anchor skill data for each of the groups of the anchor skill data, and may identify one or more job opportunities for the employee based on the clustered anchor skill data. The one or more processors may provide data identifying the one or more job opportunities to a client device associated with the employee.

According to some implementations, a non-transitory computer-readable medium may store one or more instructions that, when executed by one or more processors of a device, may cause the one or more processors to receive employee data identifying self-assessed skills, completed trainings, organizations, interests, expertise, or an education level associated with an employee, and determine, from the employee data, skill data identifying skills of the employee. The one or more instructions may cause the one or more processors to process the employee data and the skill data, with a similarity model, to determine similarity scores between the skills of the skill data based on the employee data, and add or remove one or more skills to or from the skill data for predefined target skill profile categories, based on the similarity scores and to generate modified skill data. The one or more instructions may cause the one or more processors to compare the similarity scores and a predefined threshold to determine anchor skill data from the modified skill data and for each of the predefined target skill profile categories, and group the anchor skill data for corresponding pluralities of the predefined target skill profile categories, based on a predefined group category and to generate groups of the anchor skill data. The one or more instructions may cause the one or more processors to process the groups of the anchor skill data and the similarity scores, with a clustering model, to generate clustered anchor skill data for each of the groups of the anchor skill data. The clustering model may be trained with historical groups of anchor skill data and historical similarity scores associated with historical skill data and historical employee data for a plurality of employees. The one or more instructions may cause the one or more processors to perform one or more actions based on the clustered anchor skill data.

BRIEF DESCRIPTION OF THE DRAWINGS

FIGS. 1A-1M are diagrams of an example implementation described herein.

DETAILED DESCRIPTION

Figure 1B:
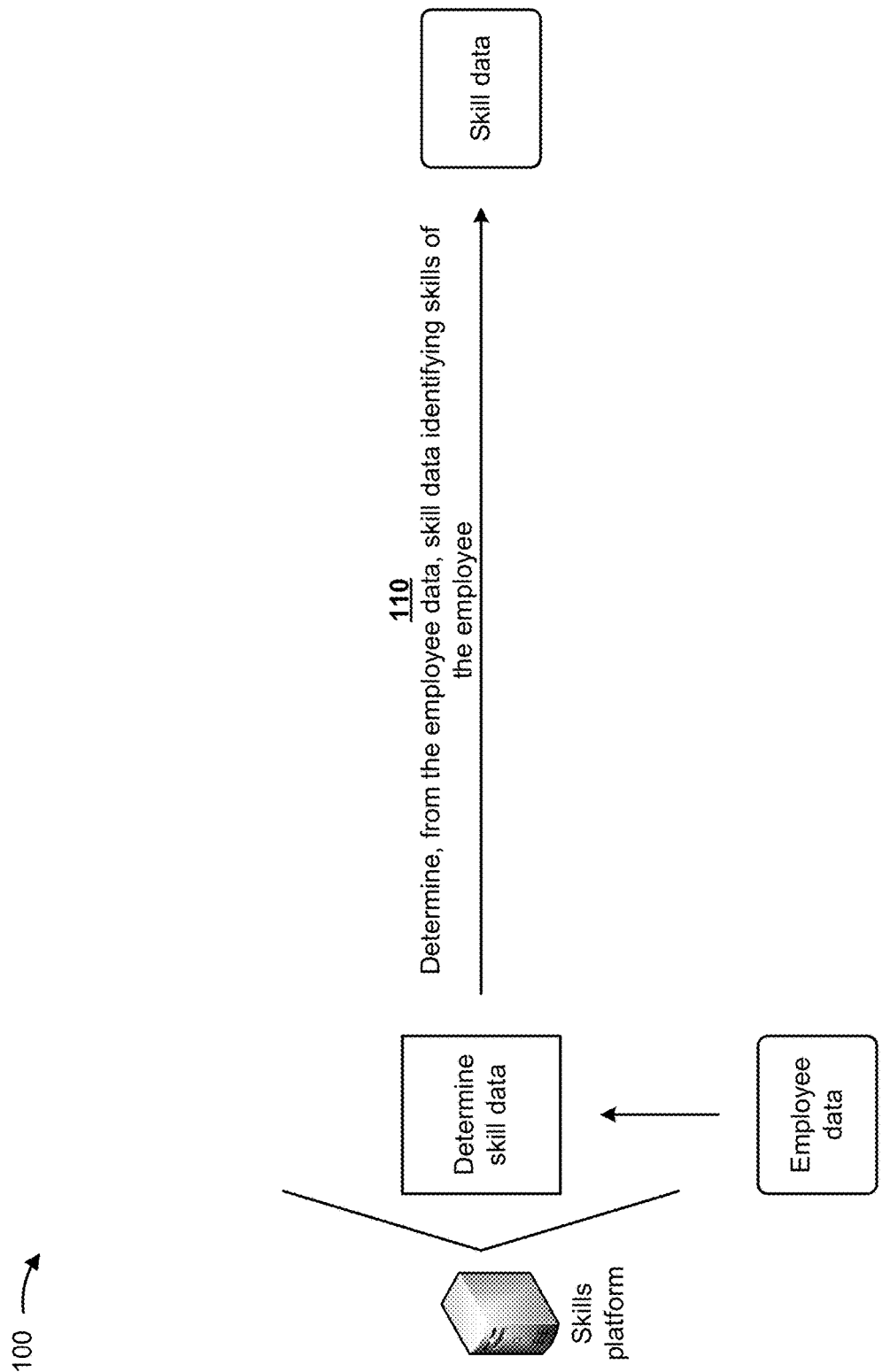

The following detailed description of example implementations refers to the accompanying drawings. The same reference numbers in different drawings may identify the same or similar elements.

Currently, entities (e.g., companies, universities, government agencies, and/or the like) lack a unified view of skills associated with current employees and with potential employees. For example, some entities determine skills of employees by providing employees with tests (e.g., to assess technical and theoretical knowledge), having employees prepare self-assessments, acquiring feedback from managers and teams, placing employees in real situations, asking for client feedback, and/or the like. Thus, current techniques for determining skills of employees waste human resources, computing resources (e.g., processing resources, memory resources, communication resources, and/or the like), networking resources, and/or the like associated with manually correlating the data gathered from tests, self-assessments, team feedback, client feedback, and/or the like, incorrectly determining skills of employees based on incorrectly correlating the data, correcting the incorrectly determined skills of employees, and/or the like.

Some implementations described herein provide a skills platform that utilizes similarity and machine learning models to determine recommended skills or job profiles to acquire for an employee of an entity. For example, the skills platform may receive employee data identifying skills (e.g., self-assessed skills, inferred skills, and/or certified skills), completed trainings, organizations, interests, expertise, and/or an education level associated with an employee, and may determine, from the employee data, skill data identifying skills of the employee. The skills platform may process the employee data and the skill data, with a similarity model, to determine similarity scores between the skills of the skill data based on the employee data, and may add or remove one or more skills to or from the skill data for predefined target skill profile categories, based on the similarity scores and to generate modified skill data. The skills platform may compare the similarity scores and a predefined threshold to determine anchor skill data from the modified skill data and for each of the predefined target skill profile categories, and may group the anchor skill data for corresponding pluralities of the predefined target skill profile categories, based on a predefined group category and to generate groups of the anchor skill data. The skills platform may process the groups of the anchor skill data and the similarity scores, with a clustering model, to generate clustered anchor skill data for each of the groups of the anchor skill data, and perform one or more actions based on the clustered anchor skill data.

In this way, the skills platform utilizes similarity and machine learning models to determine recommended skills or job profiles to acquire for an employee of an entity. The skills platform may connect the data gathered from tests, self-assessments, team feedback, client feedback, and/or the like, and may utilize the connected data to provide a unified view of the skills of the employee. The skills platform may generate a personalized education plan for the employee to complete in order to acquire a new skill or improve an existing skill. This, in turn, conserves human resources, computing resources, networking resources, and/or the like that would otherwise have been wasted by manually correlating the data gathered from tests, self-assessments, team feedback, client feedback, and/or the like, incorrectly determining skills of employees based on incorrectly correlating the data, correcting the incorrectly determined skills of employees, and/or the like.

FIGS. 1A-1M are diagrams of one or more example implementations 100 described herein. As shown in FIG. 1A, server devices may be associated with a skills platform. The server devices may include server devices associated with entities that generate employee data, skill data, and/or the like associated with employees of the entities. The skills platform may include a platform that utilizes similarity and machine learning models to determine recommended skills to acquire for an employee of an entity, as described herein.

As further shown in FIG. 1A, and by reference number 105, the skills platform may receive, from the server devices, employee data identifying skills (e.g., self-assessed skills, inferred skills, and/or certified skills), completed trainings, organizations, interests, expertise, education level, and/or the like associated with one or more employees. Additionally, the employee data may include data identifying projects, locations, goals, priorities, aspirations, certifications, authorships, patents, awards, performance metrics, languages spoken, and/or the like associated with the one or more employees. The employee data may be gathered from a number of different sources such as career-related data, employment data, social media history data, data indicating participation in organizations (e.g., professional, educational, charitable, and/or the like organizations), and other data that may be publicly available, known to an employer, provided by the one or more employees, and/or the like. As an example, the employee data may include data indicating that a particular employee is an employee of a particular company, works as an analyst, aspires to specialize in big data, follows a community, comments in sustainability forums, volunteers in health causes, works in a particular office, and/or the like.

In practice, there may be hundreds, thousands, and/or the like server devices that produce millions, billions, trillions, and/or the like of data points associated with the employee data, and thus may present a big data problem. In some implementations, the skills platform utilizes similarity and machine learning models to process the employee data. In this way, the skills platform may manage a complex, big data problem quickly and efficiently within a particular time period.

As shown in FIG. 1B, and by reference number 110, the skills platform may determine, from the employee data, skill data identifying skills of the one or more employees. In some implementations, the skills platform removes, from the employee data, data not associated with skills in order to generate the skill data identifying the skills of the one or more employees. For example, the skills platform may remove, from the employee data, data identifying work locations, home addresses, demographics, and/or the like of the one or more employees, to generate the skill data of the one or more employees. The skill data may include data identifying a set of skills for each of the one or more employees. For example, a skill for an employee may include proficiency in big data analysis, C++ programming, agile testing, agile project management, software development, human resource management, capital expenditures, and/or the like.

Figure 1C:
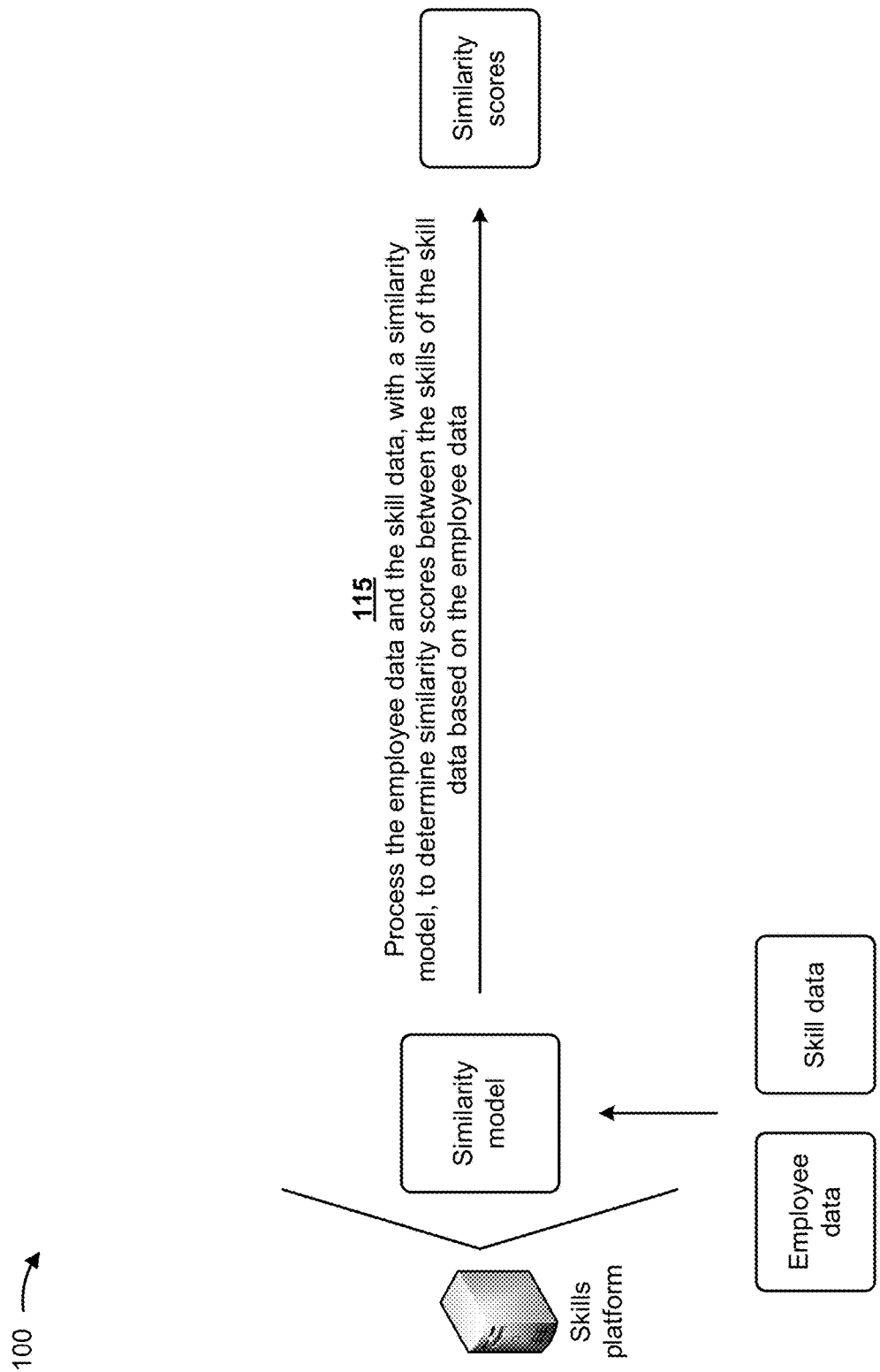

As shown in FIG. 1C, and by reference number 115, the skills platform may process the employee data and the skill data, with a similarity model, to determine similarity scores between the skills of the skill data based on the employee data. The similarity scores may represent a degree of similarity between each combination of two different skills in the skill data. In some implementations, the similarity model includes a cosine similarity on a weighted bipartite graph model. In this case, the similarity model may determine a similarity score for each pair of different skills (e.g., skill A and skill B) in the skill data (e.g., for each employee that has both skills in the skill data):

$$\text{similarity}(A, B) = \frac{\sum_{i=1}^{n} A_i \times B_i}{\sqrt{\sum_{i=1}^{n} A_i^2} \times \sqrt{\sum_{i=1}^{n} B_i^2}}$$

A bipartite graph is a graph with vertices that can be divided into two disjoint and independent sets such that every edge connects a vertex in one set to a vertex in another set.

For example, one set may represent employees and the other set may represent skills. Cosine similarity is a measure of similarity between two non-zero vectors that measures a cosine of an angle between the two non-zero vectors. A smaller angle between the vectors indicates greater similarity of the vectors.

The skills platform may train the similarity model with historical data (e.g., historical data identifying historical employee data, historical skill data, historical similarity scores, and/or the like) to determine similarity scores between the skills of the skill data based on the employee data. For example, the skills platform may train the similarity model in a manner similar to the manner described below in connection with FIG. 2. Alternatively, rather than training the similarity model, the skills platform may obtain the similarity model from another system or device that trained the similarity model. In this case, the other system or device may obtain the historical data for use in training the similarity model, and may periodically receive additional data that the other system or device may use to retrain the similarity model in order to update the similarity model. The skills platform may use the similarity model to process the employee data and the skill data, using the similarity model in a manner similar to the manner described below in connection with FIG. 3, to determine similarity scores between the skills of the skill data based on the employee data.

As shown in FIG. 1D, and by reference number 120, the skills platform may add and/or remove skills to/from the skill data for predefined target skill profile categories, based on the similarity scores and to generate modified skill data. The predefined target skill profile categories may be provided in an expert definition that includes an expert-defined hierarchy of target skill profiles and skills for an entity. In the expert definition, a first level (e.g., a branch) of the expert-defined hierarchy may correspond to the entity. The branch may be connected to one or more predefined target skill profile categories associated with the entity, which make up a second level of the expert-defined hierarchy. Each of the predefined target skill profile categories may be connected to one or more seeds associated with specific skills related to the predefined target skill profile category, which make up a third level of the expert-defined hierarchy.

In some implementations, the skills platform removes, from the skill data, one or more skills that a first predetermined quantity of other employees possess (e.g., skills that most employees possess, such as writing code for a company that develops software), one or more skills that a second predetermined quantity of other employees do not possess (e.g., skills that almost no other employees possess but are not useful to an entity, such as being able to juggle), and/or the like. For example, the skills platform may remove one or more skills from the seeds of the third level of the expert-defined hierarchy of the expert definition. In this way, the skills platform may remove skills that are shared by a relatively large number of employees (and therefore may have limited usefulness in distinguishing an employee), and may remove skills that are shared by a relatively small number of employees (and therefore may not define a significant number of employees).

In some implementations, when adding or removing the one or more skills to or from the skill data for the predefined target skill profile categories, the skills platform adds, to the skill data, one or more skills with similarity scores that satisfy a particular threshold (e.g., six, seven, eight, nine, and/or the like on a scale of ten), and/or removes, from the skill data, one or more skills with similarity scores that fail to satisfy the particular threshold. In some implementations, the skills platform performs an iterative process to continue to add a new skill as a seed in the expert definition until there is no skill that meets a defined set of conditions. For example, the defined conditions may add a skill having a similarity relationship with all the seeds, may add a skill not being included as a seed for other predefined target skill profile categories, and/or the like.

Figure 1E:
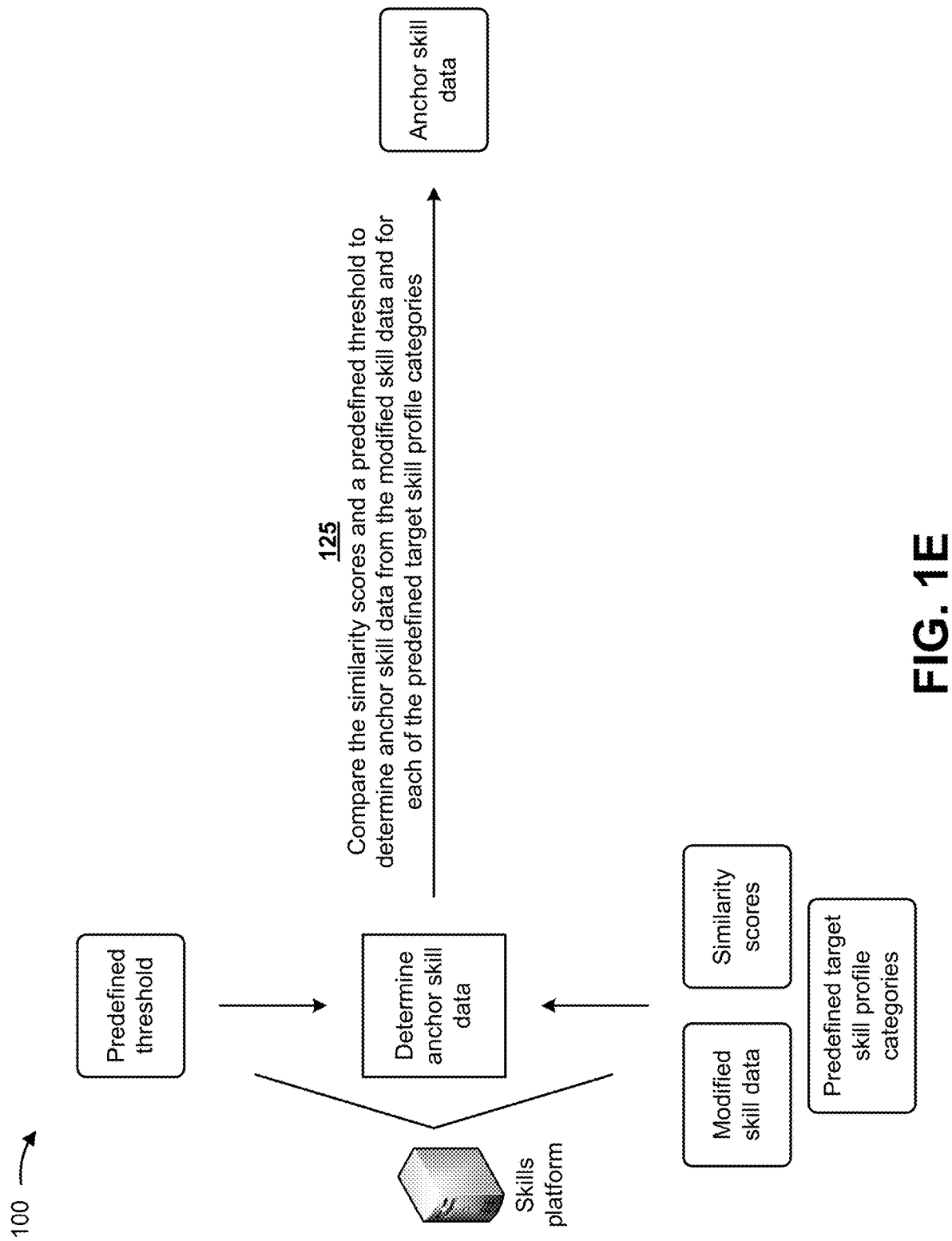

As shown in FIG. 1E, and by reference number 125, the skills platform may compare the similarity scores and a predefined threshold to determine anchor skill data from the modified skill data and for each of the predefined target skill profile categories. The anchor skill data may include skills, from the skill data (e.g., the modified skill data), with similarity scores that satisfy the predefined threshold. For example, the skills platform may identify skills from the skills data that are similar to seeds in the expert definition, and may sum similarity scores for the identified skills to generate a total similarity score. The skills platform may calculate the predefined threshold based on the total similarity score, and may initially define skills with a total similarity score above the predefined threshold as anchor skills. For skills that have been initially defined as anchor skills, the skills platform may calculate a weight of each anchor skill relative to the corresponding predefined target skill profile category, and may define the skill as an anchor skill for those predefined target skill profile categories for which the weight satisfies the predefined threshold.

Figure 1F:
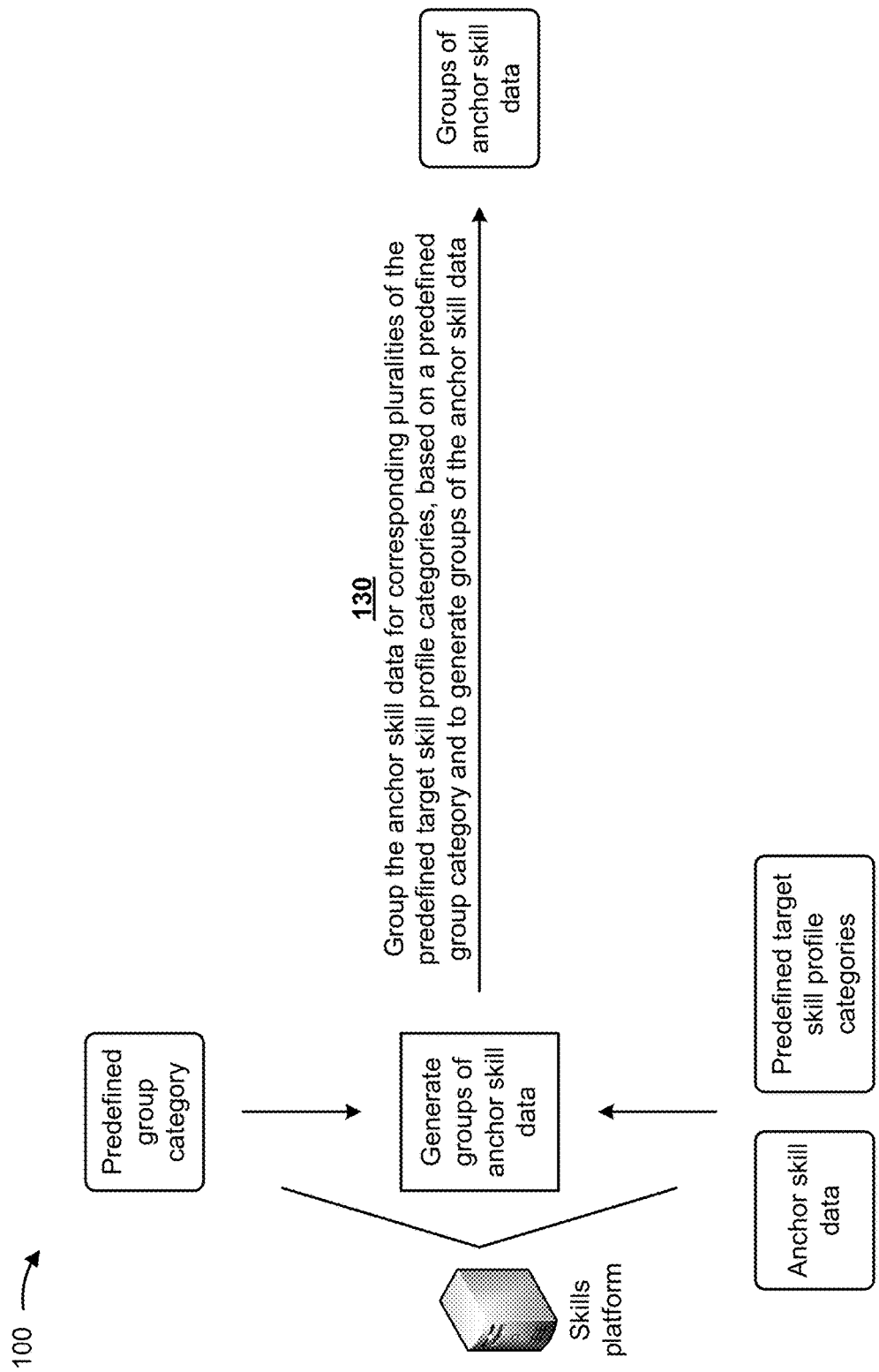

As shown in FIG. 1F, and by reference number 130, the skills platform may group the anchor skill data for corresponding pluralities of the predefined target skill profile categories, based on a predefined group category and to generate groups of the anchor skill data. The predefined group category may correspond to the branch in the expert definition, as described above. In one example, the skills platform may identify the predefined target skill profile categories associated with the branch in the expert definition (e.g., the predefined group category), and may determine the anchor skills for the branch based on the anchor skills defined above in connection with FIG. 1E (e.g., the skills for predefined target skill profile categories for which the weight satisfies the predefined threshold). In this way, the skills platform may generate groups of the anchor skill data.

Figure 1G:
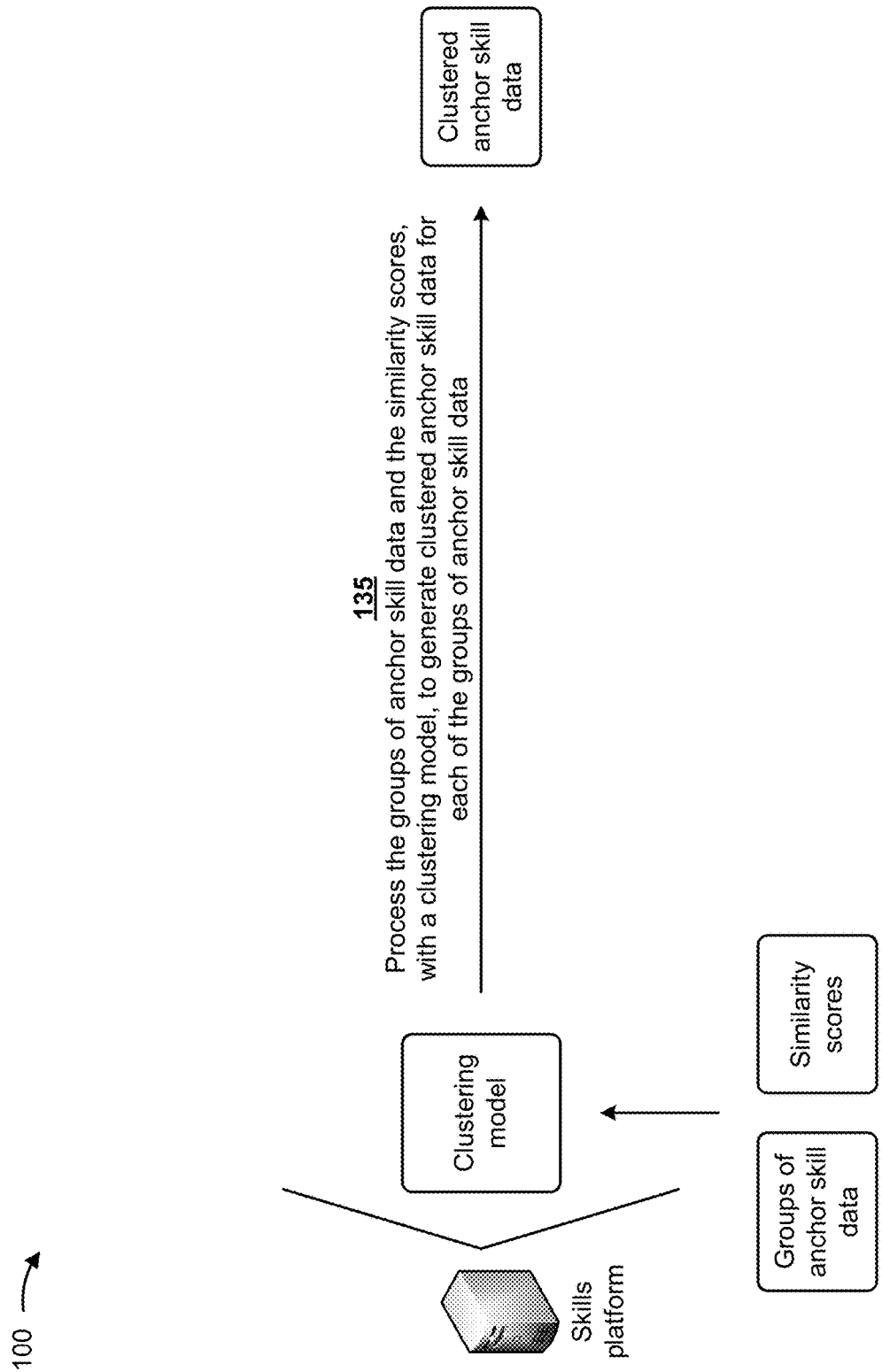

As shown in FIG. 1G, and by reference number 135, the skills platform may process the groups of anchor skill data and the similarity scores, with a clustering model, to generate clustered anchor skill data for each of the groups of anchor skill data. The clustered anchor skill data may include clusters of the anchor skill data for each of the groups of anchor skill data. For example, if a group of anchor skill data is considered a set of the anchor skill data, multiple subsets (e.g., clusters) of the anchor skill data may be provided in the set of the anchor skill data. The anchor skill data provided in each cluster of anchor skill data may include comparable similarity scores.

In some implementations, the clustering model includes a Louvain clustering model. A Louvain clustering model utilizes a hierarchical clustering model that recursively merges communities into a single node and executes modularity clustering on condensed graphs. The skills platform may apply the hierarchical clustering model on the anchor skills for the branch and the similarity relationship between the anchor skills for the branch, using the similarity scores as weights. In some implementations, the skills platform defines any of the resulting clusters that contain less than a particular quantity (e.g., three) skills as a unique cluster, in order to reduce granularity of the clustered anchor skill data. In some implementations, the skills platform identifies skills in the skill data with similarity scores that are substantially the same as similarity scores of skills in a cluster of the clustered anchor skill data, determines a similarity ranking for the identified skills in the skill data, and provides the similarity ranking for display.

The skills platform may train the clustering model with historical data (e.g., historical groups of anchor skill data, historical similarity scores associated with historical skill data, historical employee data for a plurality of employees, and/or the like) to identify the clustered anchor skill data. For example, the skills platform may train the clustering model in a manner similar to the manner described below in connection with FIG. 2. Alternatively, rather than training the clustering model, the skills platform may obtain the clustering model from another system or device that trained the clustering model. In this case, the other system or device may obtain the historical data for use in training the clustering model, and may periodically receive additional data that the other system or device may use to retrain the clustering model in order to update the clustering model. The skills platform may process the groups of anchor skill data and the similarity scores, using the clustering model and similar to the manner described below in connection with FIG. 3, to generate the clustered anchor skill data for each of the groups of anchor skill data.

Figure 1H:
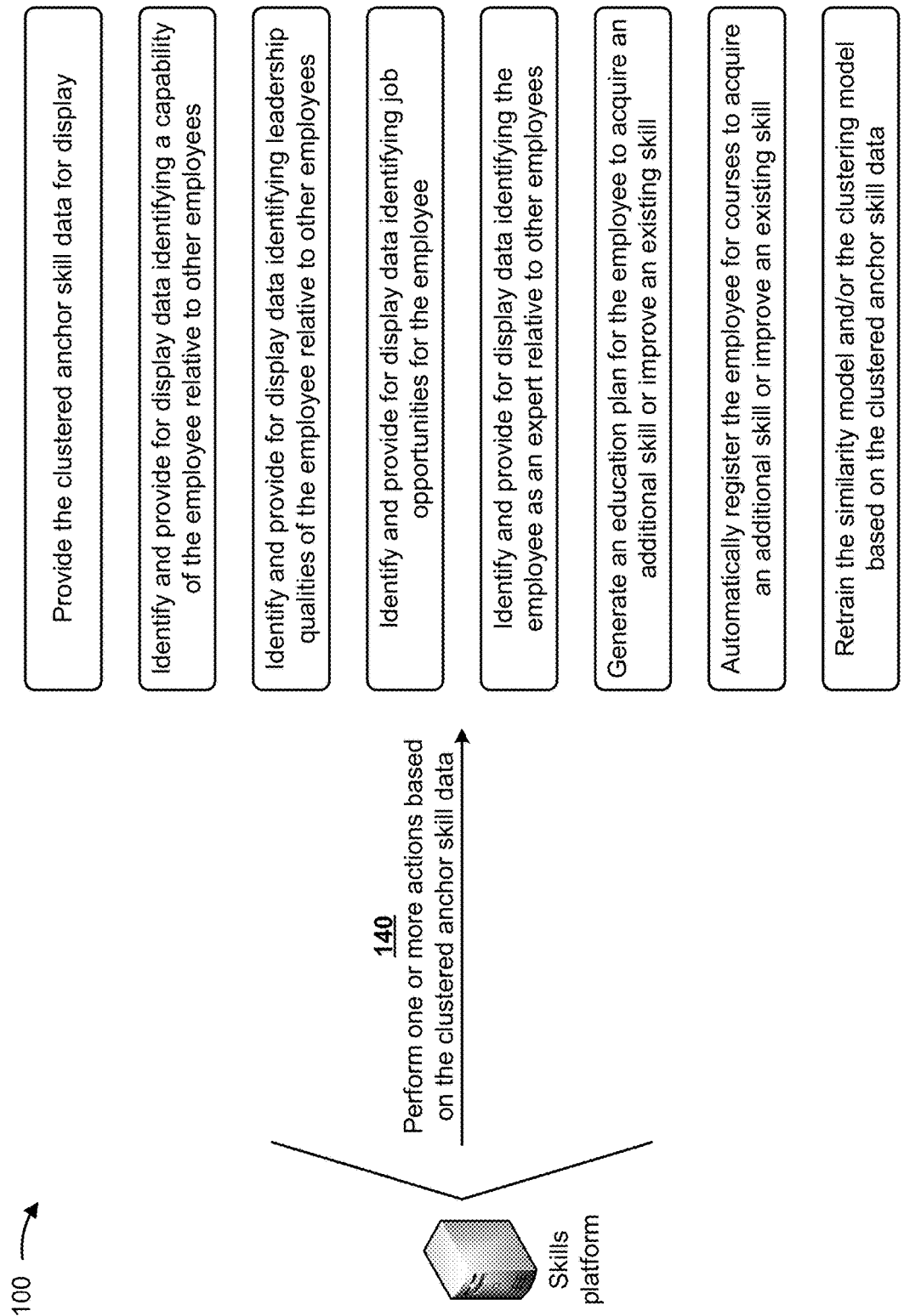

As shown in FIG. 1H, and by reference number 140, the skills platform may perform one or more actions based on the clustered anchor skill data. The one or more actions may include the skills platform providing the clustered anchor skill data for display. For example, the skills platform may provide clustered anchor skill data associated with an employee for display to the employee, an employer (e.g., a manager, human resources professional, training professional, and/or the like), a recruiter, a hiring manager, and/or the like for use in evaluating the employee. In this way, the skills platform may enable the employee, employer, recruiter, hiring manager, and/or the like to effectively evaluate the employee and understand the skills associated with the employee, thereby conserving resources (e.g., human resources, computing resources, networking resources, and/or the like) that would otherwise have been wasted attempting to accurately assess and understand the skills associated with the employee.

The one or more actions may include the skills platform identifying and providing for display data identifying a capability of the employee relative to other employees. For example, the skills platform may identify a particular skill, degree, certification, publication, and/or the like, and may provide, for display to an employer, recruiter, hiring manager, and/or the like, data identifying the particular skill, degree level, certification, publication, and/or the like. In this way, the skills platform may provide the employer, recruiter, hiring manager, and/or the like with information that may be useful in deciding or taking an action regarding hiring, promotion, training, and/or the like. This, in turn, may conserve human resources, computing resources, networking resources, and/or the like that would otherwise have been wasted attempting to obtain the information manually, from disparate sources, and/or the like.

The one or more actions may include the skills platform identifying and providing for display data identifying leadership qualities of the employee relative to other employees. For example, the skills platform may identify and provide for display data associated with leadership training, experience, evaluations of supervisors, skills related to leadership, skills shared with other employees who have leadership abilities, successes, and/or the like. In this way, the skills platform may identify and provide for display data that enables an employer, recruiter, hiring manager, and/or the like to make decisions or take actions regarding hiring of an employee for a leadership role, promoting an employee to a leadership role, training an employee for a leadership role, and/or the like.

The one or more actions may include the skills platform identifying and providing for display data identifying job opportunities for the employee. For example, the skills platform may identify and provide for display job opportunities that may be appropriate for positions requiring skills associated with the employee. In this way, the skills platform may enable the employee to identify and evaluate job opportunities appropriate for the employee, which may conserve human resources, computing resources, networking resources, and/or the like that would otherwise have been wasted attempting to manually identify job opportunities, eliminate inappropriate job opportunities, and/or the like.

The one or more actions may include the skills platform identifying and providing for display data identifying the employee as an expert relative to other employees. For example, the skills platform may identify and provide for display data that indicates the employee has expertise in a particular field, technology, capability, and/or the like. In this way, the skills platform may identify the expertise of the employee to others who may benefit from such expertise. This may conserve resources that would otherwise be wasted searching for a professional with appropriate expertise, evaluating professionals who may not have the appropriate expertise, and/or the like.

The one or more actions may include the skills platform generating an education plan for the employee to acquire an additional skill or improve an existing skill. For example, the skills platform may identify a skill that is needed, may determine, based on the clustered anchor skill data associated with the employee, that the employee lacks the needed skill, and may identify one or more educational courses that provide the needed skill. In this way, the skills platform may automatically identify gaps in employee skills, which may conserve resources that would otherwise be wasted researching and analyzing the skills of numerous employees, identifying appropriate courses for the employees, and/or the like.

The one or more actions may include the skills platform automatically registering the employee for courses to acquire an additional skill or improve an existing skill. For example, the skills platform may identify one or more courses that provide a skill needed by the employee as described above, and may automatically register the employee for the one or more courses. In this way, the skills platform may automatically remedy identified gaps in employee skills and register the employee for appropriate courses, which may conserve resources that would otherwise have been wasted in registering for the appropriate courses.

The one or more actions may include the skills platform retraining the similarity model and/or the clustering model based on the clustered anchor skill data. In this way, the skills platform may improve the accuracy of the similarity model in processing the employee data and skill data to determine similarity scores between the skills of the skill data based on the employee data, and/or may improve the accuracy of the clustering model in processing the groups of anchor skill data to generate clustered anchor skill data for each of the groups of the anchor skill data. This, in turn, may improve speed and efficiency of the similarity model and/or the clustering model, and thereby conserve computing resources, networking resources, and/or the like.

Figure 1I:
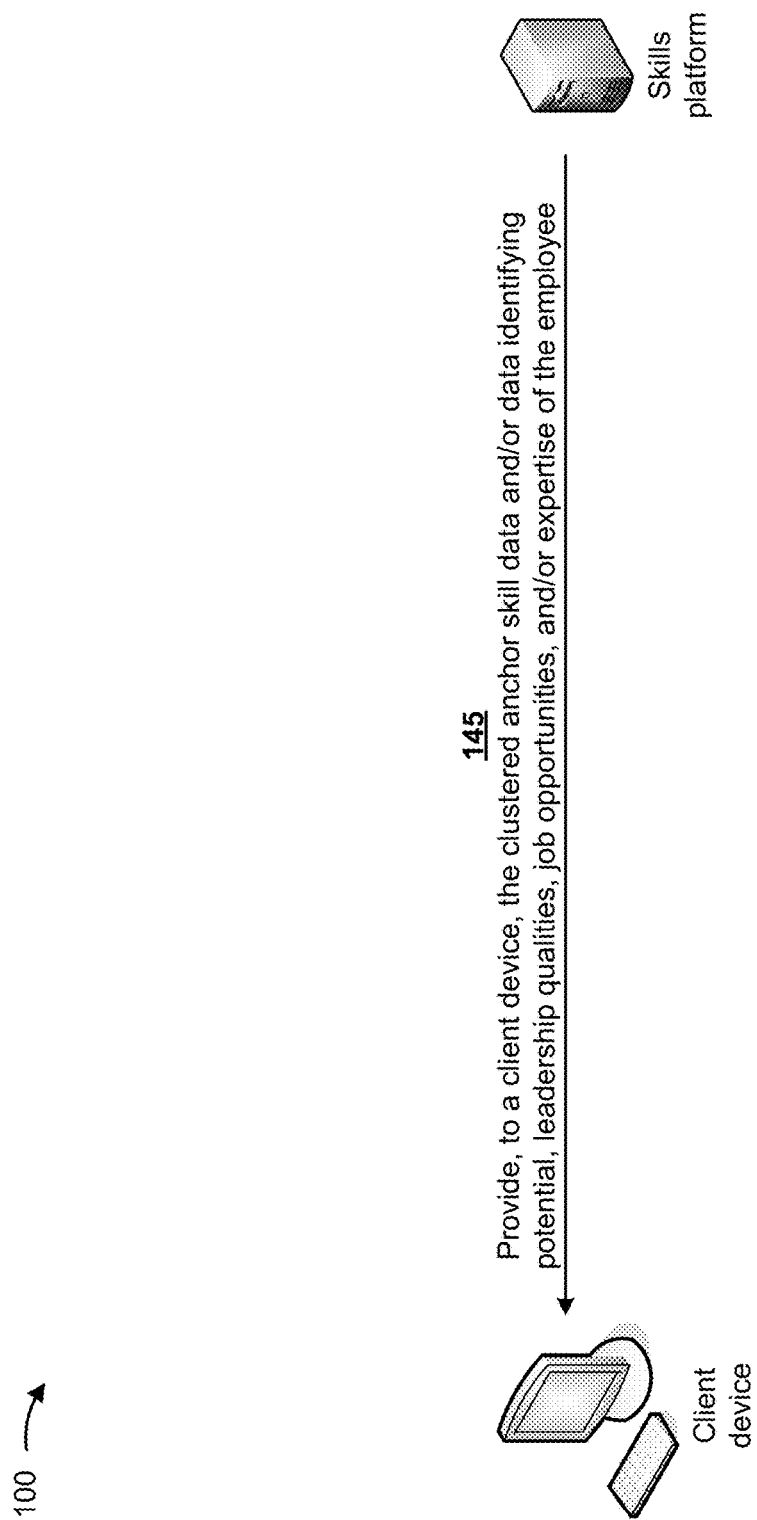

As shown in FIG. 1I, and by reference number 145, the skills platform may provide, to a client device, the clustered anchor skill data and/or data identifying potential, leadership qualities, job opportunities, and/or expertise of the employee. For example, the skills platform may provide the clustered anchor skill data and/or the data identifying potential, leadership qualities, job opportunities, and/or expertise of the employee to a client device of the employee, of an employer (e.g., a manager, human resources professional, training professional, and/or the like), a recruiter, a hiring manager, and/or the like. The client device may, in turn, display the clustered anchor skill data and/or the data identifying potential, leadership qualities, job opportunities, and/or expertise of the employee to the employee, the employer, the recruiter, the hiring manager, and/or the like.

FIGS. 1J-1L show a first use case associated with the skills platform. As shown in FIG. 1J, the skills platform may identify skills (e.g., seeds) that are initially associated with a predefined target skill profile category in an expert definition. As further shown in FIG. 1J, the skills platform may identify additional skills to be added as new seeds in an iterative process based on a total similarity, as described above.

As shown in FIG. 1K, the skills platform may initially identify skills having a total similarity score above a predefined threshold (e.g., one) as anchor skills, and may keep or not keep anchor skills based on comparing a weight of each anchor skill, relative to the predefined target skill profile category, to a particular threshold, as described above. As shown in FIG. 1L, the skills platform may remove skills (shown by reference number 150) from an expert definition, as described above in connection with FIG. 1D, and may add skills (shown by reference number 155) to refine the expert definition, as described above in connection with FIG. 1E.

Figure 1M:
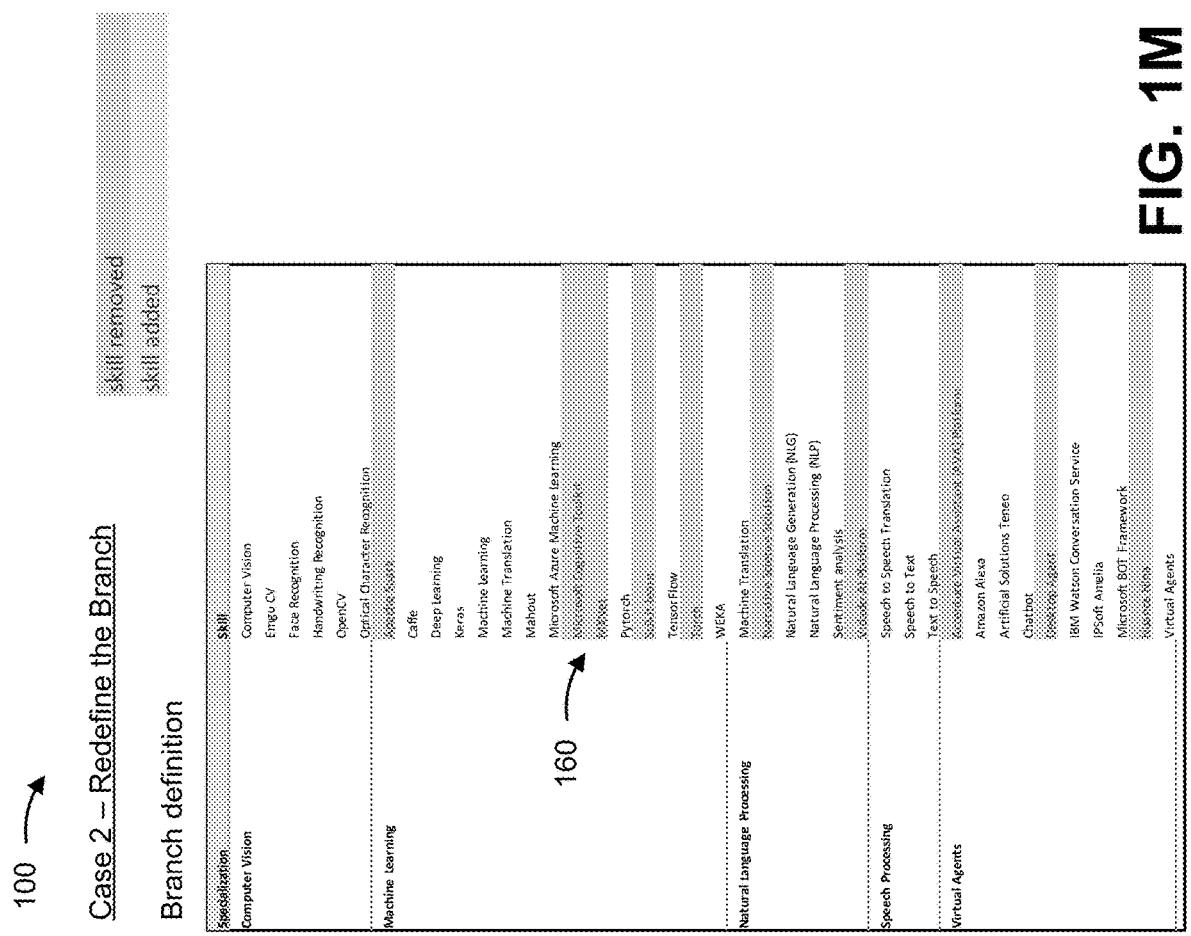

FIG. 1M shows a second use case associated with the skills platform. As shown in FIG. 1M, the skills platform may redefine a branch definition of an expert definition to remove skills (shown by reference number 160) and to add skills (shown by reference number 165) based on applying the clustering model to anchor skills, as described above in connection with FIGS. 1F and 1G.

In this way, the process for utilizing similarity and machine learning models to determine recommended skills to acquire for an employee of an entity conserves computing resources, networking resources, and/or the like that have would otherwise have been used to manually correlate the data gathered from tests, self-assessments, team feedback, client feedback, and/or the like, incorrectly determine skills of employees based on incorrectly correlating the data, correct the incorrectly determined skills of employees, and/or the like.

As indicated above, FIGS. 1A-1M are provided merely as examples. Other examples may differ from what is described with regard to FIGS. 1A-1M.

Figure 2:
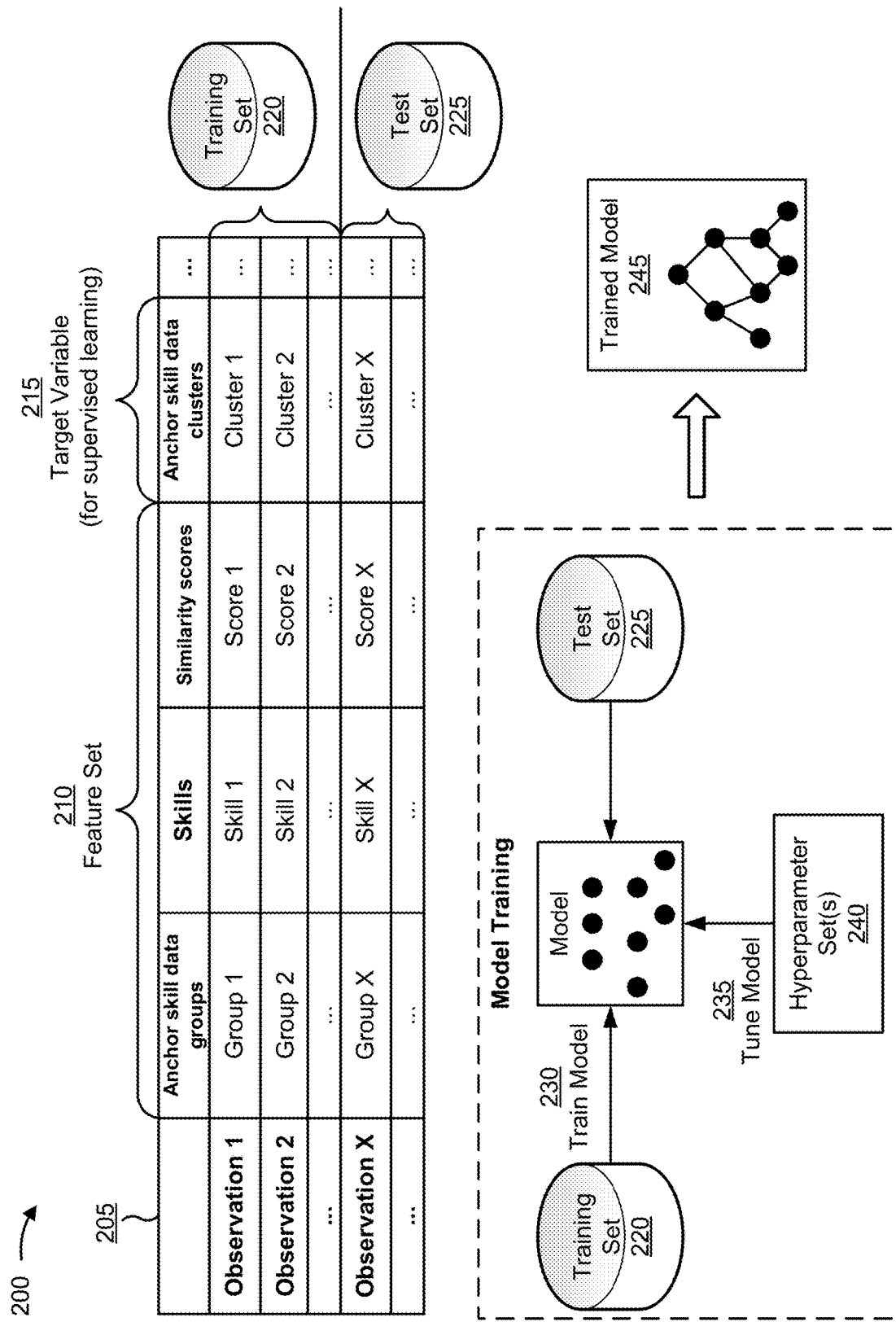
FIG. 2 is a diagram illustrating an example of training a machine learning model.

FIG. 2 is a diagram illustrating an example 200 of training a machine learning model in connection with utilizing similarity and machine learning models to determine recommended skills to acquire for an employee of an entity. The machine learning model training described herein may be performed using a machine learning system. The machine learning system may include or may be included in a computing device, a server, a cloud computing environment, and/or the like, such as the skills platform described in more detail below.

As shown by reference number 205, a machine learning model may be trained using a set of observations. The set of observations may be obtained and/or input from historical data, such as data gathered during one or more processes described herein. For example, the set of observations may include data gathered from server devices, as described elsewhere herein. In some implementations, the machine learning system may receive the set of observations (e.g., as input) from server devices and/or client devices.

As shown by reference number 210, a feature set may be derived from the set of observations. The feature set may include a set of variable types. A variable type may be referred to as a feature. A specific observation may include a set of variable values corresponding to the set of variable types. A set of variable values may be specific to an observation. In some cases, different observations may be associated with different sets of variable values, sometimes referred to as feature values. In some implementations, the machine learning system may determine variable values for a specific observation based on input received from server devices and/or client devices. For example, the machine learning system may identify a feature set (e.g., one or more features and/or corresponding feature values) from structured data input to the machine learning system, such as by extracting data from a particular column of a table, extracting data from a particular field of a form, extracting data from a particular field of a message, extracting data received in a structured data format, and/or the like. In some implementations, the machine learning system may determine features (e.g., variables types) for a feature set based on input received from server devices and/or client devices, such as by extracting or generating a name for a column, extracting or generating a name for a field of a form and/or a message, extracting or generating a name based on a structured data format, and/or the like. Additionally, or alternatively, the machine learning system may receive input from an operator to determine features and/or feature values. In some implementations, the machine learning system may perform natural language processing and/or another feature identification technique to extract features (e.g., variable types) and/or feature values (e.g., variable values) from text (e.g., unstructured data) input to the machine learning system, such as by identifying keywords and/or values associated with those keywords from the text.

As an example, a feature set for a set of observations may include a first feature of anchor skill data groups, a second feature of skills, a third feature of similarity scores, and so on. As shown, for a first observation, the first feature may have a value of group 1, the second feature may have a value of skill 1, the third feature may have a value of score 1, and so on. These features and feature values are provided as examples, and may differ in other examples. For example, the feature set may include one or more of the following features: anchor skill data groups, skills identified in the skill data, similarity scores associated with the skill data, and/or the like. In some implementations, the machine learning system may pre-process and/or perform dimensionality reduction to reduce the feature set and/or combine features of the feature set to a minimum feature set. A machine learning model may be trained on the minimum feature set, thereby conserving resources of the machine learning system (e.g., processing resources, memory resources, and/or the like) used to train the machine learning model.

As shown by reference number 215, the set of observations may be associated with a target variable type. The target variable type may represent a variable having a numeric value (e.g., an integer value, a floating point value, and/or the like), may represent a variable having a numeric value that falls within a range of values or has some discrete possible values, may represent a variable that is selectable from one of multiple options (e.g., one of multiples classes, classifications, labels, and/or the like), may represent a variable having a Boolean value (e.g., 0 or 1, True or False, Yes or No), and/or the like. A target variable type may be associated with a target variable value, and a target variable value may be specific to an observation. In some cases, different observations may be associated with different target variable values. In example 200, the target variable is anchor skill data clusters, which has a value of cluster 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model, a predictive model, and/or the like. When the target variable type is associated with continuous target variable values (e.g., a range of numbers and/or the like), the machine learning model may employ a regression technique. When the target variable type is associated with categorical target variable values (e.g., classes, labels, and/or the like), the machine learning model may employ a classification technique.

In some implementations, the machine learning model may be trained on a set of observations that do not include a target variable (or that include a target variable, but the machine learning model is not being executed to predict the target variable). This may be referred to as an unsupervised learning model, an automated data analysis model, an automated signal extraction model, and/or the like. In this case, the machine learning model may learn patterns from the set of observations without labeling or supervision, and may provide output that indicates such patterns, such as by using clustering and/or association to identify related groups of items within the set of observations.

As further shown, the machine learning system may partition the set of observations into a training set 220 that includes a first subset of observations, of the set of observations, and a test set 225 that includes a second subset of observations of the set of observations. The training set 220 may be used to train (e.g., fit, tune, and/or the like) the machine learning model, while the test set 225 may be used to evaluate a machine learning model that is trained using the training set 220. For example, for supervised learning, the test set 225 may be used for initial model training using the first subset of observations, and the test set 225 may be used to test whether the trained model accurately predicts target variables in the second subset of observations. In some implementations, the machine learning system may partition the set of observations into the training set 220 and the test set 225 by including a first portion or a first percentage of the set of observations in the training set 220 (e.g., 75%, 80%, or 85%, among other examples) and including a second portion or a second percentage of the set of observations in the test set 225 (e.g., 25%, 20%, or 15%, among other examples). In some implementations, the machine learning system may randomly select observations to be included in the training set 220 and/or the test set 225.

As shown by reference number 230, the machine learning system may train a machine learning model using the training set 220. This training may include executing, by the machine learning system, a machine learning algorithm to determine a set of model parameters based on the training set 220. In some implementations, the machine learning algorithm may include a regression algorithm (e.g., linear regression, logistic regression, and/or the like), which may include a regularized regression algorithm (e.g., Lasso regression, Ridge regression, Elastic-Net regression, and/or the like). Additionally, or alternatively, the machine learning algorithm may include a decision tree algorithm, which may include a tree ensemble algorithm (e.g., generated using bagging and/or boosting), a random forest algorithm, a boosted trees algorithm, and/or the like. A model parameter may include an attribute of a machine learning model that is learned from data input into the model (e.g., the training set 220). For example, for a regression algorithm, a model parameter may include a regression coefficient (e.g., a weight). For a decision tree algorithm, a model parameter may include a decision tree split location, as an example.

As shown by reference number 235, the machine learning system may use one or more hyperparameter sets 240 to tune the machine learning model. A hyperparameter may include a structural parameter that controls execution of a machine learning algorithm by the machine learning system, such as a constraint applied to the machine learning algorithm. Unlike a model parameter, a hyperparameter is not learned from data input into the model.

An example hyperparameter for a regularized regression algorithm includes a strength (e.g., a weight) of a penalty applied to a regression coefficient to mitigate overfitting of the machine learning model to the training set 220. The penalty may be applied based on a size of a coefficient value (e.g., for Lasso regression, such as to penalize large coefficient values), may be applied based on a squared size of a coefficient value (e.g., for Ridge regression, such as to penalize large squared coefficient values), may be applied based on a ratio of the size and the squared size (e.g., for Elastic-Net regression), may be applied by setting one or more feature values to zero (e.g., for automatic feature selection), and/or the like. Example hyperparameters for a decision tree algorithm include a tree ensemble technique to be applied (e.g., bagging, boosting, a random forest algorithm, a boosted trees algorithm, and/or the like), a number of features to evaluate, a number of observations to use, a maximum depth of each decision tree (e.g., a number of branches permitted for the decision tree), a number of decision trees to include in a random forest algorithm, and/or the like.

To train a machine learning model, the machine learning system may identify a set of machine learning algorithms to be trained (e.g., based on operator input that identifies the one or more machine learning algorithms, based on random selection of a set of machine learning algorithms, and/or the like), and may train the set of machine learning algorithms (e.g., independently for each machine learning algorithm in the set) using the training set 220. The machine learning system may tune each machine learning algorithm using one or more hyperparameter sets 240 (e.g., based on operator input that identifies hyperparameter sets 240 to be used, based on randomly generating hyperparameter values, and/or the like). The machine learning system may train a particular machine learning model using a specific machine learning algorithm and a corresponding hyperparameter set 240. In some implementations, the machine learning system may train multiple machine learning models to generate a set of model parameters for each machine learning model, where each machine learning model corresponds to a different combination of a machine learning algorithm and a hyperparameter set 240 for that machine learning algorithm.

In some implementations, the machine learning system may perform cross-validation when training a machine learning model. Cross validation can be used to obtain a reliable estimate of machine learning model performance using only the training set 220, and without using the test set 225, such as by splitting the training set 220 into a number of groups (e.g., based on operator input that identifies the number of groups, based on randomly selecting a number of groups, and/or the like) and using those groups to estimate model performance. For example, using k-fold cross-validation, observations in the training set 220 may be split into k groups (e.g., in order or at random). For a training procedure, one group may be marked as a hold-out group, and the remaining groups may be marked as training groups. For the training procedure, the machine learning system may train a machine learning model on the training groups and then test the machine learning model on the hold-out group to generate a cross-validation score. The machine learning system may repeat this training procedure using different hold-out groups and different test groups to generate a cross-validation score for each training procedure. In some implementations, the machine learning system may independently train the machine learning model k times, with each individual group being used as a hold-out group once and being used as a training group k-1 times. The machine learning system may combine the cross-validation scores for each training procedure to generate an overall cross-validation score for the machine learning model. The overall cross-validation score may include, for example, an average cross-validation score (e.g., across all training procedures), a standard deviation across cross-validation scores, a standard error across cross-validation scores, and/or the like.

In some implementations, the machine learning system may perform cross-validation when training a machine learning model by splitting the training set into a number of groups (e.g., based on operator input that identifies the number of groups, based on randomly selecting a number of groups, and/or the like). The machine learning system may perform multiple training procedures and may generate a cross-validation score for each training procedure. The machine learning system may generate an overall cross-validation score for each hyperparameter set 240 associated with a particular machine learning algorithm. The machine learning system may compare the overall cross-validation scores for different hyperparameter sets 240 associated with the particular machine learning algorithm, and may select the hyperparameter set 240 with the best (e.g., highest accuracy, lowest error, closest to a desired threshold, and/or the like) overall cross-validation score for training the machine learning model. The machine learning system may then train the machine learning model using the selected hyperparameter set 240, without cross-validation (e.g., using all of data in the training set 220 without any hold-out groups), to generate a single machine learning model for a particular machine learning algorithm. The machine learning system may then test this machine learning model using the test set 225 to generate a performance score, such as a mean squared error (e.g., for regression), a mean absolute error (e.g., for regression), an area under receiver operating characteristic curve (e.g., for classification), and/or the like. If the machine learning model performs adequately (e.g., with a performance score that satisfies a threshold), then the machine learning system may store that machine learning model as a trained machine learning model 245 to be used to analyze new observations, as described below in connection with FIG. 3.

In some implementations, the machine learning system may perform cross-validation, as described above, for multiple machine learning algorithms (e.g., independently), such as a regularized regression algorithm, different types of regularized regression algorithms, a decision tree algorithm, different types of decision tree algorithms, and/or the like. Based on performing cross-validation for multiple machine learning algorithms, the machine learning system may generate multiple machine learning models, where each machine learning model has the best overall cross-validation score for a corresponding machine learning algorithm. The machine learning system may then train each machine learning model using the entire training set 220 (e.g., without cross-validation), and may test each machine learning model using the test set 225 to generate a corresponding performance score for each machine learning model. The machine learning model may compare the performance scores for each machine learning model, and may select the machine learning model with the best (e.g., highest accuracy, lowest error, closest to a desired threshold, and/or the like) performance score as the trained machine learning model 245.

As indicated above, FIG. 2 is provided as an example. Other examples may differ from what is described in connection with FIG. 2. For example, the machine learning model may be trained using a different process than what is described in connection with FIG. 2. Additionally, or alternatively, the machine learning model may employ a different machine learning algorithm than what is described in connection with FIG. 2, such as a Bayesian estimation algorithm, a k-nearest neighbor algorithm, an a priori algorithm, a k-means algorithm, a support vector machine algorithm, a neural network algorithm (e.g., a convolutional neural network algorithm), a deep learning algorithm, and/or the like.

Figure 3:
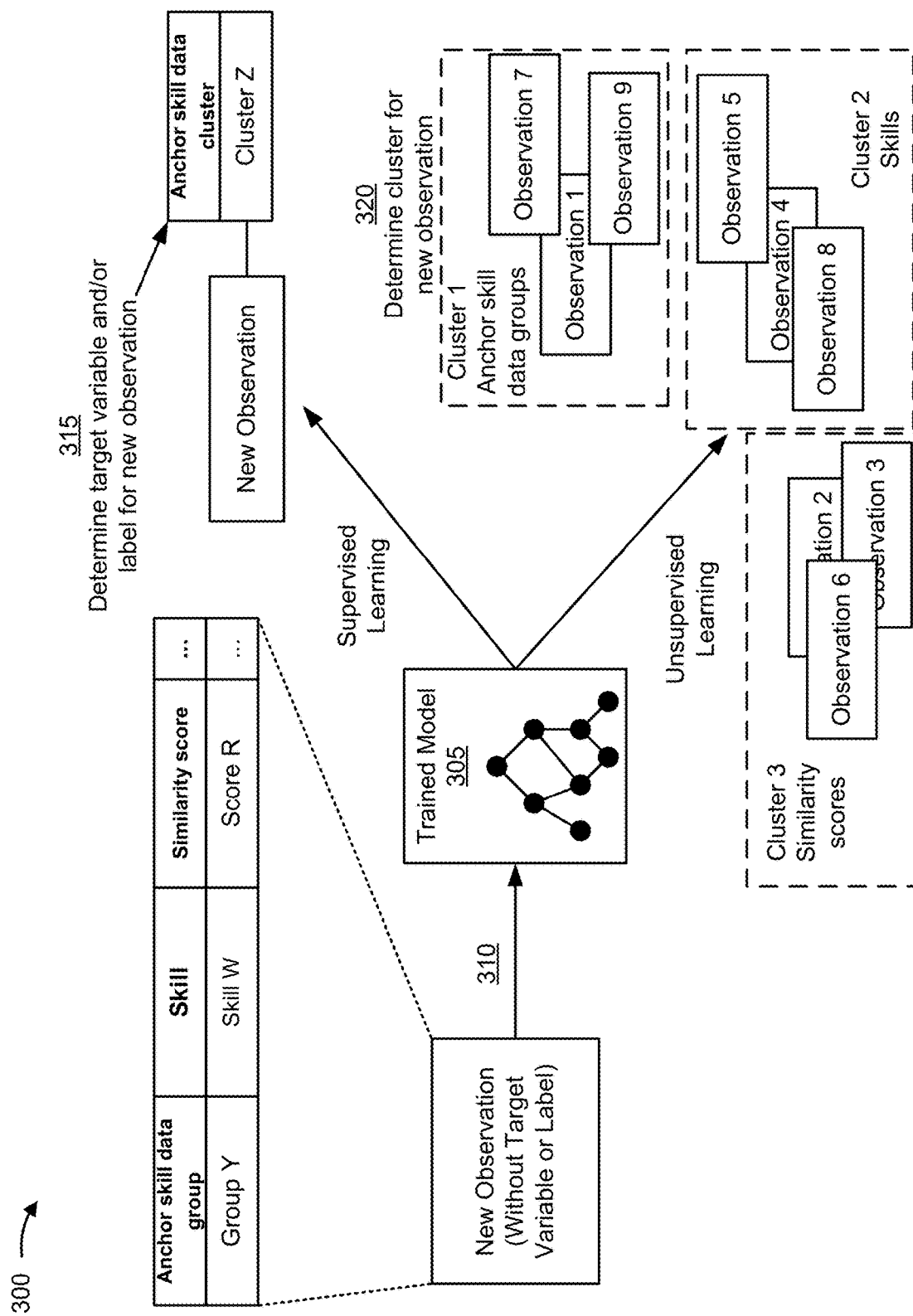
FIG. 3 is a diagram illustrating an example of applying a trained machine learning model to a new observation.

FIG. 3 is a diagram illustrating an example 300 of applying a trained machine learning model to a new observation. The new observation may be input to a machine learning system that stores a trained machine learning model 305. In some implementations, the trained machine learning model 305 may be the trained machine learning model 245 described above in connection with FIG. 2. The machine learning system may include or may be included in a computing device, a server, a cloud computing environment, and/or the like, such as the skills platform.

As shown by reference number 310, the machine learning system may receive a new observation (or a set of new observations), and may input the new observation to the machine learning model 305. As shown, the new observation may include a first feature of an anchor skill data group, a second feature of a skill, a third feature of a similarity score, and so on, as an example. The machine learning system may apply the trained machine learning model 305 to the new observation to generate an output (e.g., a result). The type of output may depend on the type of machine learning model and/or the type of machine learning task being performed. For example, the output may include a predicted (e.g., estimated) value of target variable (e.g., a value within a continuous range of values, a discrete value, a label, a class, a classification, and/or the like), such as when supervised learning is employed. Additionally, or alternatively, the output may include information that identifies a cluster to which the new observation belongs, information that indicates a degree of similarity between the new observation and one or more prior observations (e.g., which may have previously been new observations input to the machine learning model and/or observations used to train the machine learning model), and/or the like, such as when unsupervised learning is employed.

In some implementations, the trained machine learning model 305 may predict a value of cluster Z for the target variable of an anchor skill data cluster for the new observation, as shown by reference number 315. Based on this prediction (e.g., based on the value having a particular label or classification, based on the value satisfying or failing to satisfy a threshold, and/or the like), the machine learning system may provide a recommendation and/or output for determination of a recommendation, such as the anchor skill data cluster is a skills cluster, a component, a title, and/or the like of the technical architecture diagram. Additionally, or alternatively, the machine learning system may perform an automated action and/or may cause an automated action to be performed (e.g., by instructing another device to perform the automated action), such as clustering data in cluster Z based on the target variable. As another example, if the machine learning system were to predict a value of cluster A for the target variable of the anchor skill data cluster, then the machine learning system may provide a different recommendation (e.g., the anchor skill data cluster is a similarity scores cluster) and/or may perform or cause performance of a different automated action (e.g., clustering data in cluster A). In some implementations, the recommendation and/or the automated action may be based on the target variable value having a particular label (e.g., classification, categorization, and/or the like), may be based on whether the target variable value satisfies one or more threshold (e.g., whether the target variable value is greater than a threshold, is less than a threshold, is equal to a threshold, falls within a range of threshold values, and/or the like), and/or the like.

In some implementations, the trained machine learning model 305 may classify (e.g., cluster) the new observation in a cluster, as shown by reference number 320. The observations within a cluster may have a threshold degree of similarity. As an example, if the machine learning system classifies the new observation in a first cluster (e.g., anchor skill data groups), then the machine learning system may provide a first recommendation, such as the anchor skill data cluster is associated with an anchor skill data group. Additionally, or alternatively, the machine learning system may perform a first automated action and/or may cause a first automated action to be performed (e.g., by instructing another device to perform the automated action) based on classifying the new observation in the first cluster, such as clustering in the anchor skill data groups cluster. As another example, if the machine learning system were to classify the new observation in a second cluster (e.g., skills), then the machine learning system may provide a second (e.g., different) recommendation (e.g., the anchor skill data cluster is a skill cluster) and/or may perform or cause performance of a second (e.g., different) automated action, such as clustering in the skills cluster.

In this way, the machine learning system may apply a rigorous and automated process to determine recommended skills to acquire for an employee. The machine learning system enables recognition and/or identification of tens, hundreds, thousands, or millions of features and/or feature values for tens, hundreds, thousands, or millions of observations, thereby increasing accuracy and consistency and reducing delay associated with determining recommended skills to acquire for an employee relative to requiring computing resources to be allocated for tens, hundreds, or thousands of operators to manually determine recommended skills to acquire for an employee using the features or feature values.

As indicated above, FIG. 3 is provided as an example. Other examples may differ from what is described in connection with FIG. 3.

Figure 4:
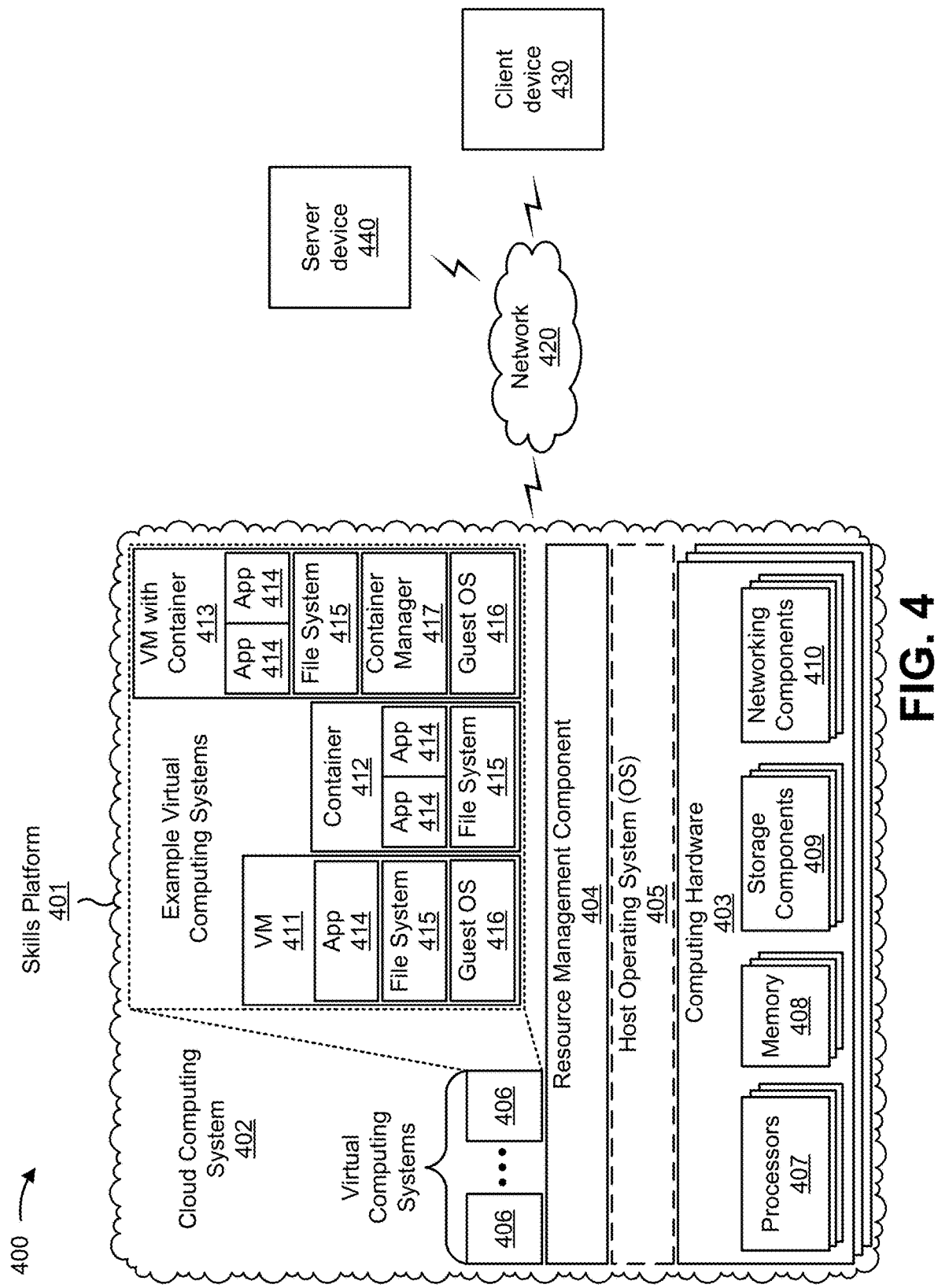
FIG. 4 is a diagram of an example environment in which systems and/or methods described herein may be implemented.

FIG. 4 is a diagram of an example environment 400 in which systems and/or methods described herein may be implemented. As shown in FIG. 4, environment 400 may include a skills platform 401. The skills platform 401 may include one or more elements of a cloud computing system 402 and/or may execute within the cloud computing system 402 (e.g., as one or more virtual computing systems 406). The cloud computing system 402 may include one or more elements 403-417, as described in more detail below. As further shown in FIG. 4, environment 400 may include a network 420, a client device 430, and/or a server device 440. Devices of environment 400 may interconnect via wired connections, wireless connections, or a combination of wired and wireless connections.

The cloud computing system 402 includes computing hardware 403, a resource management component 404, a host operating system (OS) 405, and/or one or more virtual computing systems 406. The resource management component 404 may perform virtualization (e.g., abstraction) of computing hardware 403 to create the one or more virtual computing systems 406. Using such virtualization, the resource management component 404 enables a single computing device (e.g., a computer, a server, a host device, and/or the like) to operate as if the single computing device were multiple computing devices, such as by creating multiple isolated virtual computing systems 406 from computing hardware 403 of the single computing device. The multiple virtual computing systems 406 operate independently from one another and do not interact with one another. In this way, computing hardware 403 can operate more efficiently, with lower power consumption, higher reliability, higher availability, higher utilization, greater flexibility, and lower cost than using separate computing devices.

Computing hardware 403 includes hardware and corresponding resources from one or more computing devices. For example, computing hardware 403 may include hardware from a single computing device (e.g., a single server or host device) or from multiple computing devices (e.g., multiple servers or host devices), such as multiple computing devices in one or more data centers, server farms, server pools, and/or the like. As shown, computing hardware 403 may include one or more processors 407, one or more memories 408, one or more storage components 409, and/or one or more networking components 410. Computing hardware 403 may be interconnected via one or more wired and/or wireless buses, which may interconnect computing hardware 403 within a single computing device and/or across multiple computing devices.

A processor 407 includes a central processing unit, a graphics processing unit, and/or the like. A memory 408 includes random-access memory, read-only memory, and/or the like. The memory 408 may store a set of instructions (e.g., one or more instructions) for execution by the processor 407. The processor 407 may execute the set of instructions to perform one or more operations or processes described herein. In some implementations, execution of the set of instructions, by one or more processors 407, causes the one or more processors 407 and/or the skills platform 401 to perform one or more operations or processes described herein. A storage component 409 includes a hard disk or another type of storage device that stores information, data, and/or software (e.g., code, instructions, and/or the like) related to the operation and use of the skills platform 401. In some implementations, memory 408 and/or storage component 409 is/are implemented as a non-transitory computer readable medium. A networking component 410 includes a network interface and corresponding hardware that enables the skills platform 401 to communicate with other devices of environment 400 via a wired connection and/or a wireless connection, such as via network 420. Additional examples of a processor, a memory, a storage component, and a networking component (e.g., a communication interface) are described elsewhere herein.

The resource management component 404 includes a virtualization application (e.g., executing on hardware, such as computing hardware 403) capable of virtualizing computing hardware 403 to start (e.g., create or spin up), stop (e.g., delete or tear down), and/or manage one or more virtual computing systems 406. Such virtualization may include operating system virtualization, shared kernel virtualization (e.g., container-based virtualization), kernel level virtualization, hypervisor virtualization, paravirtualization, full virtualization, hardware virtualization, and/or the like. The resource management component 404 may control access to and/or use of computing hardware 403 and/or software executing on computing hardware 403. Additionally, or alternatively, the resource management component 404 may perform binary rewriting to scan instructions received from a virtual computing system 406 and replace any privileged instructions with safe emulations of those instructions. The resource management component 404 may include a hypervisor or a virtual machine monitor, such as when the virtual computing systems 406 are virtual machines 411. Additionally, or alternatively, the resource management component 404 may include a container manager, such as when the virtual computing systems 406 are containers 412.

In some implementations, the resource management component 404 executes within and/or in coordination with a host operating system 405. For example, the resource management component 404 may execute on top of the host operating system 405 rather than interacting directly with computing hardware 403, such as when the resource management component 404 is a hosted hypervisor (e.g., a Type 2 hypervisor) or a container manager. In this case, the host operating system 405 may control access to and/or use of computing hardware 403 and/or software executing on computing hardware 403 based on information and/or instructions received from the resource management component 404. Alternatively, the resource management component 404 may interact directly with computing hardware 403 rather than interacting with the host operating system 405, such as when the resource management component 404 is a bare-metal hypervisor (e.g., a Type 1 hypervisor). Thus, in some implementations, the cloud computing system 402 does not include a host operating system 405. In some implementations, the host operating system 405 includes and/or executes an administrator application to enable a system administrator to manage, customize, and/or configure cloud computing system 402.

A virtual computing system 406 includes a virtual environment that enables cloud-based execution of operations and/or processes described herein using computing hardware 403. As shown, a virtual computing system 406 may include a virtual machine 411, a container 412, a hybrid environment 413 that includes a virtual machine and a container, and/or the like. A virtual computing system 406 may execute one or more applications 414 using a file system 415. The file system 415 may include binary files, software libraries, and/or other resources required to execute applications 414 on a guest operating system 416 or the host operating system 405. In some implementations, a virtual computing system 406 (e.g., a virtual machine 411 or a hybrid environment 413) includes a guest operating system 416. In some implementations, a virtual computing system 406 (e.g., a container 412 or a hybrid environment 413) includes a container manager 417.

A virtual machine 411 is an emulation of a computing device that enables execution of separate, isolated instances of virtual computing devices (e.g., multiple virtual machines 411) on the same computing hardware 403. The guest operating systems 416 and applications 414 of multiple virtual machines 411 may share computing hardware 403 from a single computing device or from multiple computing devices (e.g., a pool of computing devices). Each separate virtual machine 411 may include a guest operating system 416, a file system 415, and one or more applications 414. With a virtual machine 411, the underlying computing hardware 403 is virtualized, and the guest operating system 416 executes on top of this virtualized hardware. Using virtual machines 411 enables different types of guest operating systems 416 to execute on the same computing hardware 403 in an isolated environment, but with more resource usage and overhead than containers 412.

Unlike a virtual machine 411, a container 412 virtualizes a host operating system 405 rather than the underlying computing hardware 403. Thus, a container 412 does not require a guest operating system 416 because the application(s) 414 included in the container 412 execute directly on the host operating system 405 using a file system 415 included in the container 412. Each separate container 412 may share the kernel of the host operating system 405, and different applications 414 within a single container 412 may share a file system 415. This sharing of a file system 415 among multiple applications 414 reduces the need to reproduce operating system code for different applications, and enables a single host operating system 405 to execute multiple applications 414 and/or containers 412. As a result, containers 412 enable a greater quantity of applications 414 to execute on a smaller quantity of computing devices as compared to virtual machines 411.

A hybrid environment 413 includes elements of a virtual machine 411 and a container 412. For example, a hybrid environment 413 may include a guest operating system 416 that executes on top of virtualized hardware. A container manager 417 may execute on top of the guest operating system 416 to start, stop, and/or manage one or more containers within the hybrid environment 413. Using a hybrid environment 413 enables different types of guest operating systems 416 to execute on the same computing hardware 403 in an isolated environment, while also enabling lightweight containers to execute on top of the guest operating system 416.

The quantity of applications 414 shown in FIG. 4 as executing within each virtual computing system 406 is shown as an example, and a different quantity of applications 414 may execute within each virtual computing system. Furthermore, although the skills platform 401 may include one or more elements 403-417 of the cloud computing system 402, may execute within the cloud computing system 402, and/or may be hosted within the cloud computing system 402, in some implementations, the skills platform 401 may not be cloud-based (e.g., may be implemented outside of a cloud computing system) or may be partially cloud-based. For example, the skills platform 401 may include one or more devices that are not part of the cloud computing system 402, such as device 500 of FIG. 5, which may include a standalone server or another type of computing device. The skills platform 401 may perform one or more operations and/or processes described in more detail elsewhere herein.

Network 420 includes one or more wired and/or wireless networks. For example, network 420 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks. The network 420 enables communication among the devices of environment 400.

Client device 430 includes one or more devices capable of receiving, generating, storing, processing, and/or providing information, such as information described herein. For example, client device 430 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), or a similar type of device. In some implementations, client device 430 may receive information from and/or transmit information to skills platform 401 and/or server device 440.

Server device 440 includes one or more devices capable of receiving, generating, storing, processing, and/or providing information, as described herein. For example, server device 440 may include a laptop computer, a tablet computer, a desktop computer, a group of server devices, or a similar type of device. In some implementations, server device 440 may receive information from and/or transmit information to skills platform 401 and/or client device 430.

The number and arrangement of devices and networks shown in FIG. 4 are provided as an example. In practice, there may be additional devices and/or networks, fewer devices and/or networks, different devices and/or networks, or differently arranged devices and/or networks than those shown in FIG. 4. Furthermore, two or more devices shown in FIG. 4 may be implemented within a single device, or a single device shown in FIG. 4 may be implemented as multiple, distributed devices. Additionally, or alternatively, a set of devices (e.g., one or more devices) of environment 400 may perform one or more functions described as being performed by another set of devices of environment 400.

Figure 5:
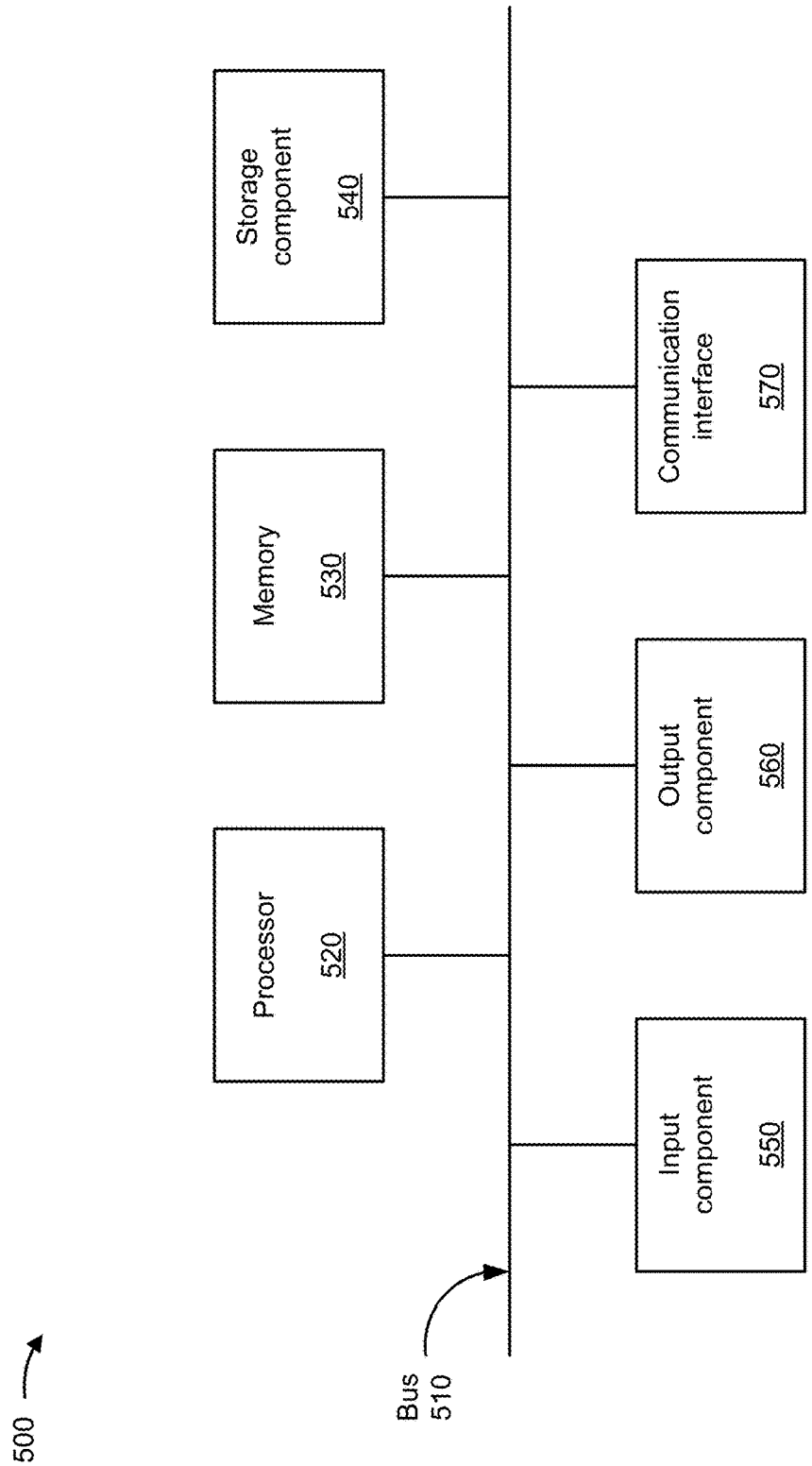
FIG. 5 is a diagram of example components of one or more devices of FIG. 4.

FIG. 5 is a diagram of example components of a device 500. Device 500 may correspond to skills platform 401, client device 430, and/or server device 440. In some implementations, skills platform 401, client device 430, and/or server device 440 may include one or more devices 500 and/or one or more components of device 500. As shown in FIG. 5, device 500 may include a bus 510, a processor 520, a memory 530, a storage component 540, an input component 550, an output component 560, and a communication interface 570.

Bus 510 includes a component that permits communication among the components of device 500. Processor 520 is implemented in hardware, firmware, or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 may include a sensor for sensing information (e.g., a global positioning system (GPS) component, an accelerometer, a gyroscope, and/or an actuator). Output component 560 includes a component that provides output information from device 500 (e.g., a display, a speaker, and/or one or more LEDs).

Communication interface 570 includes a transceiver-like component (e.g., a transceiver and/or a separate receiver and transmitter) that enables device 500 to communicate with other devices, such as via a wired connection, a wireless connection, or a combination of wired and wireless connections. Communication interface 570 may permit device 500 to receive information from another device and/or provide information to another device. For example, communication interface 570 may include an Ethernet interface, an optical interface, a coaxial interface, an infrared interface, an RF interface, a universal serial bus (USB) interface, a wireless local area interface, a cellular network interface, and/or the like.

Device 500 may perform one or more processes described herein. Device 500 may perform these processes based on processor 520 executing software instructions stored by a non-transitory computer-readable medium, such as memory 530 and/or storage component 540. A computer-readable medium is defined herein as a non-transitory memory device. A memory device includes memory space within a single physical storage device or memory space spread across multiple physical storage devices.

Software instructions may be read into memory 530 and/or storage component 540 from another computer-readable medium or from another device via communication interface 570. When executed, software instructions stored in memory 530 and/or storage component 540 may cause processor 520 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 may include additional components, fewer components, different components, or differently arranged components than those shown in FIG. 5. Additionally, or alternatively, a set of components (e.g., one or more components) of device 500 may perform one or more functions described as being performed by another set of components of device 500.

Figure 6:
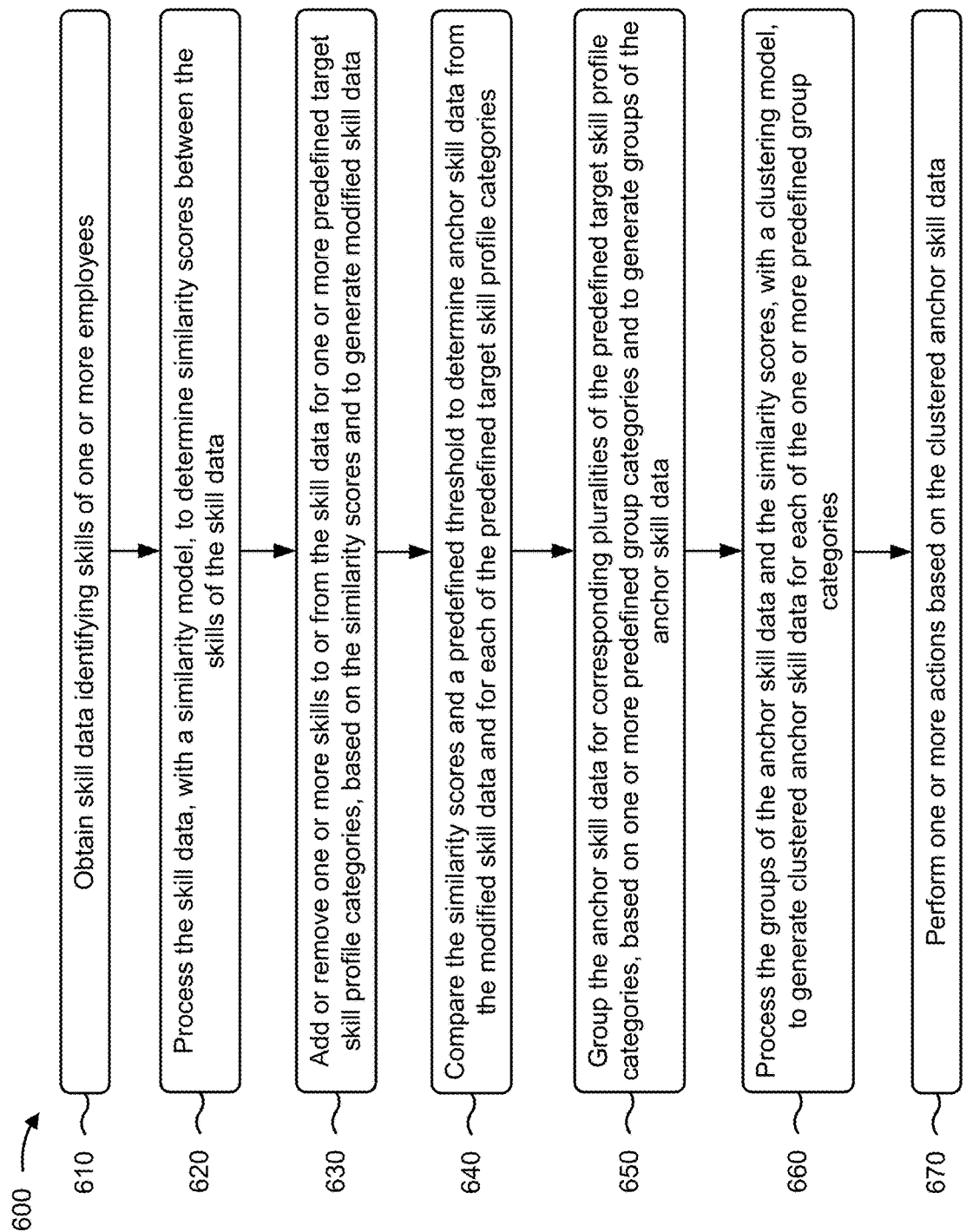
FIGS. 6-8 are flow charts of example processes for utilizing similarity and machine learning models to determine recommended skills to acquire for an employee of an entity.

FIG. 6 is a flow chart of an example process 600 associated with utilizing similarity and machine learning models to determine recommended skills to acquire for an employee of an entity. In some implementations, one or more process blocks of FIG. 6 may be performed by a device (e.g., skills platform 401). In some implementations, one or more process blocks of FIG. 6 may be performed by another device or a group of devices separate from or including the device, such as a client device (e.g., client device 430), a server device (e.g., server device 440), and/or the like. Additionally, or alternatively, one or more process blocks of FIG. 6 may be performed by one or more components of a device 500, such as processor 520, memory 530, storage component 540, input component 550, output component 560, communication interface 570, and/or the like.

As shown in FIG. 6, process 600 may include obtaining skill data identifying skills of one or more employees (block 610). For example, the device may obtain skill data identifying skills of one or more employees, as described above.

As further shown in FIG. 6, process 600 may include processing the skill data, with a similarity model, to determine similarity scores between the skills of the skill data (block 620). For example, the device may process the skill data, with a similarity model, to determine similarity scores between the skills of the skill data, as described above. The similarity model may include a cosine similarity on a weighted bipartite graph model.

As further shown in FIG. 6, process 600 may include adding or removing one or more skills to or from the skill data for one or more predefined target skill profile categories, based on the similarity scores and to generate modified skill data (block 630). For example, the device may add or remove one or more skills to or from the skill data for one or more predefined target skill profile categories, based on the similarity scores and to generate modified skill data, as described above. Adding or removing the one or more skills to or from the skill data for the predefined target skill profile categories may include removing, from the skill data, one or more skills that a first predetermined quantity of other employees possess and one or more skills that a second predetermined quantity of other employees do not possess.

As further shown in FIG. 6, process 600 may include comparing the similarity scores and a predefined threshold to determine anchor skill data from the modified skill data and for each of the predefined target skill profile categories (block 640). For example, the device may compare the similarity scores and a predefined threshold to determine anchor skill data from the modified skill data and for each of the predefined target skill profile categories, as described above.

As further shown in FIG. 6, process 600 may include grouping the anchor skill data for corresponding pluralities of the predefined target skill profile categories, based on one or more predefined group categories and to generate groups of the anchor skill data (block 650). For example, the device may group the anchor skill data for corresponding pluralities of the predefined target skill profile categories, based on one or more predefined group categories and to generate groups of the anchor skill data, as described above.

As further shown in FIG. 6, process 600 may include processing the groups of the anchor skill data and the similarity scores, with a clustering model, to generate clustered anchor skill data for each of the one or more predefined group categories (block 660). For example, the device may process the groups of the anchor skill data and the similarity scores, with a clustering model, to generate clustered anchor skill data for each of the one or more predefined group categories, as described above.

As further shown in FIG. 6, process 600 may include performing one or more actions based on the clustered anchor skill data (block 660). For example, the device may perform one or more actions based on the clustered anchor skill data, as described above. Performing the one or more actions may include providing the clustered anchor skill data for display; identifying and providing for display data identifying a capability of the employee relative to other employees; identifying and providing for display data identifying leadership qualities of the employee relative to other employees; identifying and providing for display data identifying job opportunities for the employee; identifying and providing for display data identifying the employee as an expert relative to other employees; generating an education plan for the employee to acquire an additional skill or improve an existing skill; automatically registering the employee for one or more courses to acquire an additional skill or improve an existing skill; retraining the similarity model based on the clustered anchor skill data; or retraining the clustering model based on the clustered anchor skill data.

In some implementations, process 600 includes receiving employee data identifying one or more of self-assessed skills, completed trainings, organizations, interests, expertise, or an education level associated with an employee; and determining the skill data based on the employee data. The similarity scores between the skills of the skill data may be determined based on the employee data.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
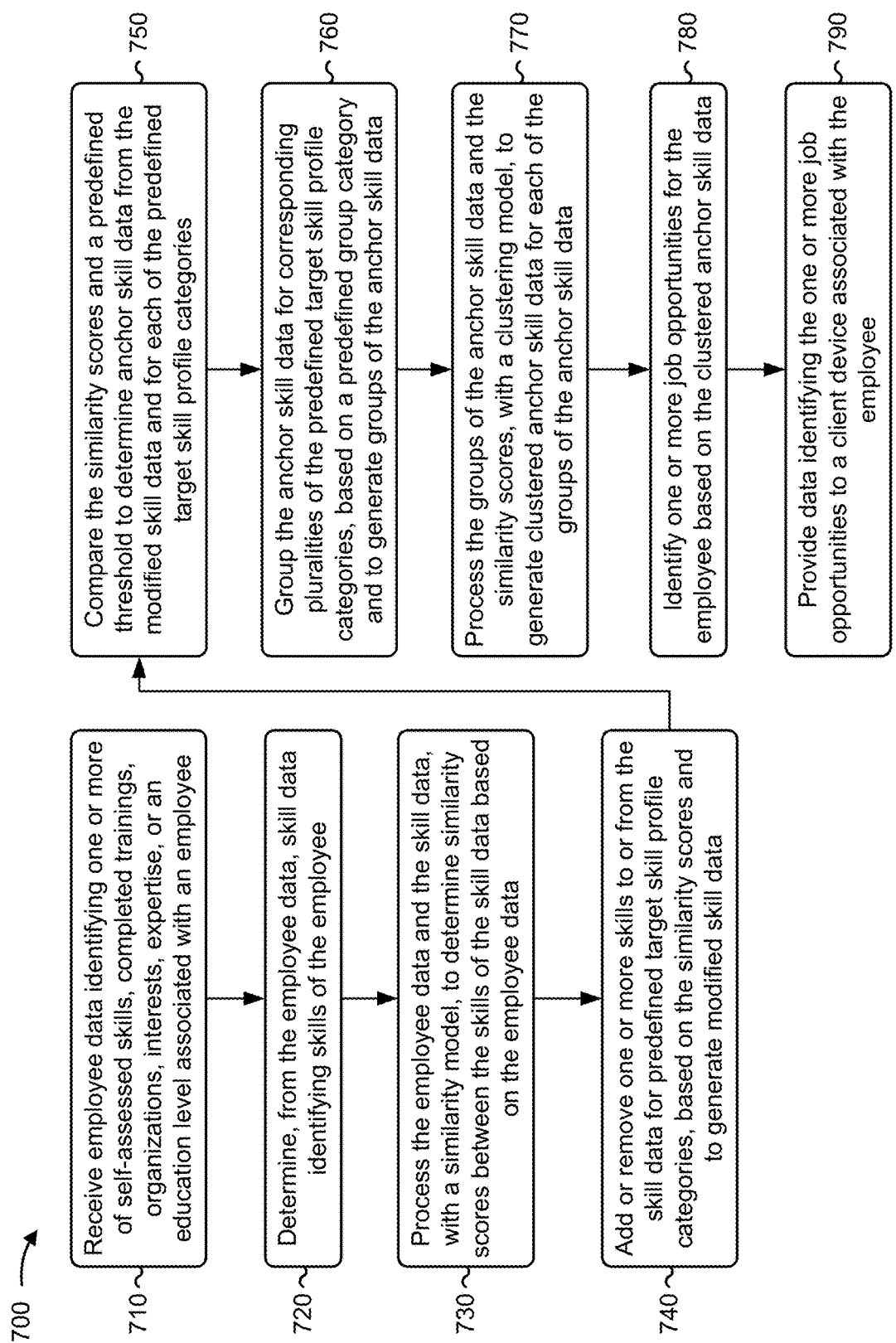

FIG. 7 is a flow chart of an example process 700 associated with utilizing similarity and machine learning models to determine recommended skills to acquire for an employee of an entity. In some implementations, one or more process blocks of FIG. 7 may be performed by a device (e.g., skills platform 401). In some implementations, one or more process blocks of FIG. 7 may be performed by another device or a group of devices separate from or including the device, such as a client device (e.g., client device 430), a server device (e.g., server device 440), and/or the like. Additionally, or alternatively, one or more process blocks of FIG. 7 may be performed by one or more components of a device 500, such as processor 520, memory 530, storage component 540, input component 550, output component 560, communication interface 570, and/or the like.

As shown in FIG. 7, process 700 may include receiving employee data identifying one or more of self-assessed skills, completed trainings, organizations, interests, expertise, or an education level associated with an employee (block 710). For example, the device may receive employee data identifying one or more of self-assessed skills, completed trainings, organizations, interests, expertise, or an education level associated with an employee, as described above.

As further shown in FIG. 7, process 700 may include determining, from the employee data, skill data identifying skills of the employee (block 720). For example, the device may determine, from the employee data, skill data identifying skills of the employee, as described above.

As further shown in FIG. 7, process 700 may include processing the employee data and the skill data, with a similarity model, to determine similarity scores between the skills of the skill data based on the employee data (block 730). For example, the device may process the employee data and the skill data, with a similarity model, to determine similarity scores between the skills of the skill data based on the employee data, as described above.

As further shown in FIG. 7, process 700 may include adding or removing one or more skills to or from the skill data for predefined target skill profile categories, based on the similarity scores and to generate modified skill data (block 740). For example, the device may add or remove one or more skills to or from the skill data for predefined target skill profile categories, based on the similarity scores and to generate modified skill data, as described above. Adding or removing the one or more skills to or from the skill data for the predefined target skill profile categories may include adding, to the skill data, one or more skills with similarity scores that satisfy a particular threshold; and removing, from the skill data, one or more skills with similarity scores that fail to satisfy the particular threshold.

As further shown in FIG. 7, process 700 may include comparing the similarity scores and a predefined threshold to determine anchor skill data from the modified skill data and for each of the predefined target skill profile categories (block 750). For example, the device may compare the similarity scores and a predefined threshold to determine anchor skill data from the modified skill data and for each of the predefined target skill profile categories, as described above. The anchor skill data may include skills, from the skill data, with similarity scores that satisfy the predefined threshold.

As further shown in FIG. 7, process 700 may include grouping the anchor skill data for corresponding pluralities of the predefined target skill profile categories, based on a predefined group category and to generate groups of the anchor skill data (block 760). For example, the device may group the anchor skill data for corresponding pluralities of the predefined target skill profile categories, based on a predefined group category and to generate groups of the anchor skill data, as described above.

As further shown in FIG. 7, process 700 may include processing the groups of the anchor skill data and the similarity scores, with a clustering model, to generate clustered anchor skill data for each of the groups of the anchor skill data (block 770). For example, the device may process the groups of the anchor skill data and the similarity scores, with a clustering model, to generate clustered anchor skill data for each of the groups of the anchor skill data, as described above.

As further shown in FIG. 7, process 700 may include identifying one or more job opportunities for the employee based on the clustered anchor skill data (block 780). For example, the device may identify one or more job opportunities for the employee based on the clustered anchor skill data, as described above.

As further shown in FIG. 7, process 700 may include providing data identifying the one or more job opportunities to a client device associated with the employee (block 790). For example, the device may provide data identifying the one or more job opportunities to a client device associated with the employee, as described above.

In some implementations, process 700 includes generating, based on the clustered anchor skill data, an education plan for the employee to acquire an additional skill or improve an existing skill; and providing the education plan to a client device associated with the employee.

In some implementations, process 700 includes automatically registering the employee for one or more courses to acquire an additional skill or improve an existing skill; and providing, to a client device associated with the employee, information identifying the one or more courses for which the employee is registered.

In some implementations, process 700 may include identifying skills in the skill data with similarity scores that are substantially the same as similarity scores of skills in a cluster of the clustered anchor skill data; determining a similarity ranking for the identified skills in the skill data; and providing the similarity ranking for display.

In some implementations, process 700 includes training the clustering model with historical groups of anchor skill data and historical similarity scores associated with historical skill data and historical employee data for a plurality of employees.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8:
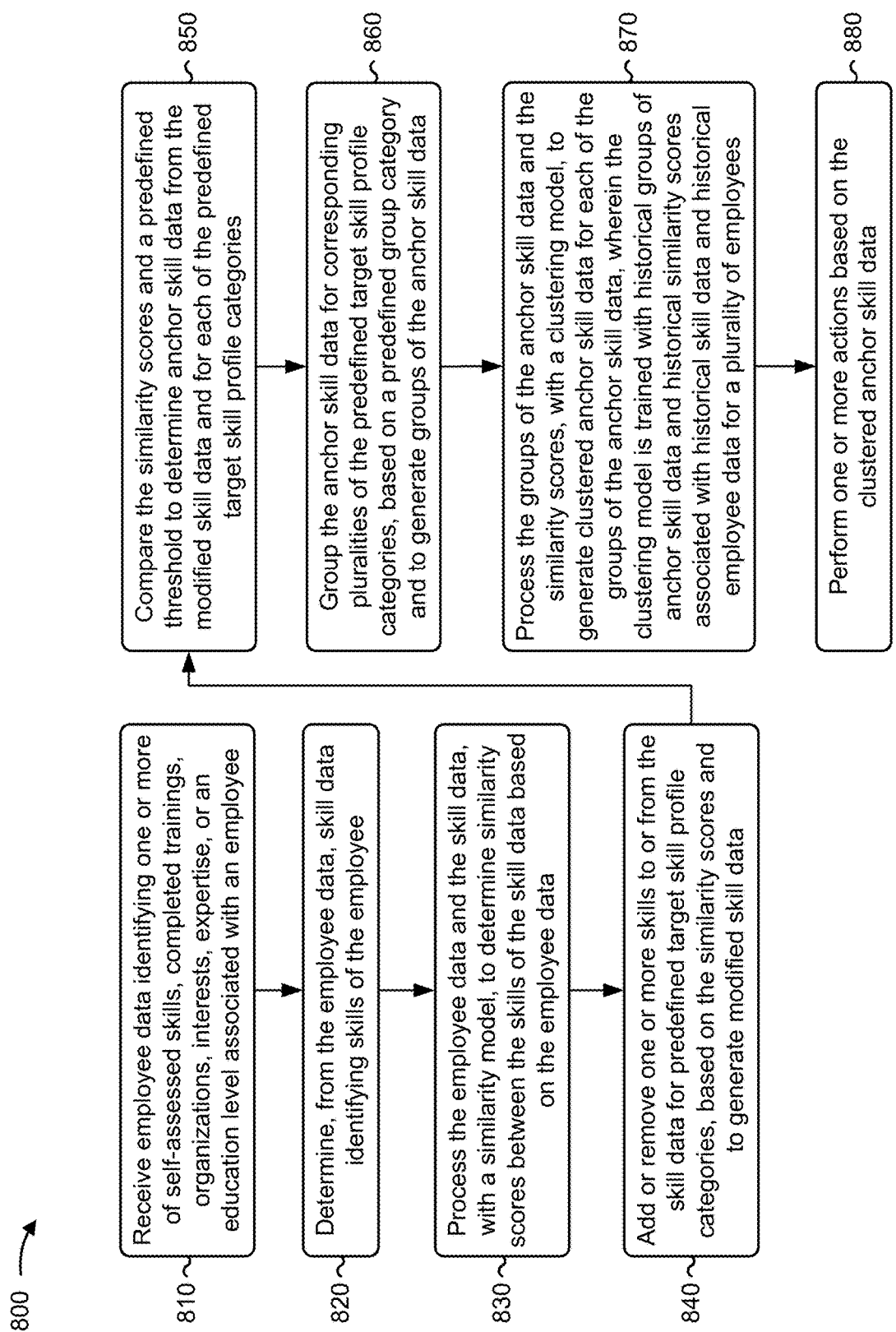

FIG. 8 is a flow chart of an example process 800 associated with utilizing similarity and machine learning models to determine recommended skills to acquire for an employee of an entity. In some implementations, one or more process blocks of FIG. 8 may be performed by a device (e.g., skills platform 401). In some implementations, one or more process blocks of FIG. 8 may be performed by another device or a group of devices separate from or including the device, such as a client device (e.g., client device 430), a server device (e.g., server device 440), and/or the like. Additionally, or alternatively, one or more process blocks of FIG. 8 may be performed by one or more components of a device 500, such as processor 520, memory 530, storage component 540, input component 550, output component 560, communication interface 570, and/or the like.

As shown in FIG. 8, process 800 may include receiving employee data identifying one or more of self-assessed skills, completed trainings, organizations, interests, expertise, or an education level associated with an employee (block 810). For example, the device may receive employee data identifying one or more of self-assessed skills, completed trainings, organizations, interests, expertise, or an education level associated with an employee, as described above.

As further shown in FIG. 8, process 800 may include determining, from the employee data, skill data identifying skills of the employee (block 820). For example, the device may determine, from the employee data, skill data identifying skills of the employee, as described above.

As further shown in FIG. 8, process 800 may include processing the employee data and the skill data, with a similarity model, to determine similarity scores between the skills of the skill data based on the employee data (block 830). For example, the device may process the employee data and the skill data, with a similarity model, to determine similarity scores between the skills of the skill data based on the employee data, as described above.

As further shown in FIG. 8, process 800 may include adding or removing one or more skills to or from the skill data for predefined target skill profile categories, based on the similarity scores and to generate modified skill data (block 840). For example, the device may add or remove one or more skills to or from the skill data for predefined target skill profile categories, based on the similarity scores and to generate modified skill data, as described above. Adding or removing the one or more skills to or from the skill data for the predefined target skill profile categories may include removing, from the skill data, one or more skills that a first predetermined quantity of other employees possess and one or more skills that a second predetermined quantity of other employees do not possess. Adding or removing the one or more skills to or from the skill data for the predefined target skill profile categories may include adding, to the skill data, one or more skills with similarity scores that satisfy a particular threshold; and removing, from the skill data, one or more skills with similarity scores that fail to satisfy the particular threshold.

As further shown in FIG. 8, process 800 may include comparing the similarity scores and a predefined threshold to determine anchor skill data from the modified skill data and for each of the predefined target skill profile categories (block 850). For example, the device may compare the similarity scores and a predefined threshold to determine anchor skill data from the modified skill data and for each of the predefined target skill profile categories, as described above.

As further shown in FIG. 8, process 800 may include grouping the anchor skill data for corresponding pluralities of the predefined target skill profile categories, based on a predefined group category and to generate groups of the anchor skill data (block 860). For example, the device may group the anchor skill data for corresponding pluralities of the predefined target skill profile categories, based on a predefined group category and to generate groups of the anchor skill data, as described above.

As further shown in FIG. 8, process 800 may include processing the groups of the anchor skill data and the similarity scores, with a clustering model, to generate clustered anchor skill data for each of the groups of the anchor skill data, wherein the clustering model is trained with historical groups of anchor skill data and historical similarity scores associated with historical skill data and historical employee data for a plurality of employees (block 870). For example, the device may process the groups of the anchor skill data and the similarity scores, with a clustering model, to generate clustered anchor skill data for each of the groups of the anchor skill data, as described above. In some implementations, the clustering model is trained with historical groups of anchor skill data and historical similarity scores associated with historical skill data and historical employee data for a plurality of employees.

As further shown in FIG. 8, process 800 may include performing one or more actions based on the clustered anchor skill data (block 880). For example, the device may perform one or more actions based on the clustered anchor skill data, as described above. Performing the one or more actions may include providing the clustered anchor skill data for display; identifying and providing for display data identifying a capability of the employee relative to other employees; identifying and providing for display data identifying leadership qualities of the employee relative to other employees; identifying and providing for display data identifying job opportunities for the employee; identifying and providing for display data identifying the employee as an expert relative to other employees; generating an education plan for the employee to acquire an additional skill or improve an existing skill; automatically registering the employee for one or more courses to acquire an additional skill or improve an existing skill; retraining the similarity model based on the clustered anchor skill data; or retraining the clustering model based on the clustered anchor skill data. Performing the one or more actions may include automatically registering the employee for one or more courses to acquire an additional skill or improve an existing skill; and providing, to a client device associated with the employee, information identifying the one or more courses for which the employee is registered.

In some implementations, process 800 may include identifying skills in the skill data with similarity scores that are substantially the same as similarity scores of skills in a cluster of the clustered anchor skill data; determining a similarity ranking for the identified skills in the skill data; and providing the similarity ranking for display.

Although FIG. 8 shows example blocks of process 800, in some implementations, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

Certain user interfaces have been described herein and/or shown in the figures. A user interface may include a graphical user interface, a non-graphical user interface, a text-based user interface, and/or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code - it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    obtaining, by a device, skill data identifying skills of one or more employees;
    obtaining, by the device, historical data,
        wherein the historical data is associated with at least one of:
            historical employee data,
            historical skill data,
            historical similarity scores, and/or
            historical groups of anchor skill data;
    obtaining, by the device and based on the historical data, a set of observations;
    partitioning, by the device, the set of observations into a training set;
    training a similarity model and/or a clustering model with the training set;
    processing, by the device, the skill data, with the similarity model, to determine similarity scores between the skills identified by the skill data,
        wherein the similarity model includes a cosine similarity on a weighted bipartite graph model;
    adding or removing, by the device, one or more skills to or from the skill data for one or more predefined target skill profile categories, based on the similarity scores and to generate modified skill data,
        wherein the predefined target skill profile categories are based on an expert-defined hierarchy of target skill profiles and skills for an entity,
        wherein the expert-defined hierarchy of target skill profiles and skills for the entity includes:
            a first level corresponding to the entity,
            a second level corresponding to one or more predefined target skill profile categories, and
            a third level corresponding to one or more skills associated with a predefined target skill profile category of the one or more predefined target skill profile categories;
    comparing, by the device, the similarity scores and a predefined threshold to determine anchor skill data from the modified skill data and for each of the predefined target skill profile categories,
        wherein comparing the similarity scores and the predefined threshold comprises:
            initially identifying a set of skills having a total similarity score above the predefined threshold as anchor skills from one or more seeds of the third level,
            selectively adding or removing a skill, of the set of skills, based on comparing a weight of the skill, calculated relative to the predefined target skill profile category, to a particular threshold, and
            redefining the expert-defined hierarchy based on selecting, adding or removing the skill,
                wherein redefining the expert-defined hierarchy comprises performing an iterative process to continue to add new skills, of the set of skills, as seeds to the one or more seeds in the third level;
    grouping, by the device, the anchor skill data for corresponding pluralities of the predefined target skill profile categories, based on one or more predefined group categories and to generate groups of the anchor skill data;
    processing, by the device, the groups of the anchor skill data and the similarity scores, with the clustering model, to generate clustered anchor skill data for each of the one or more predefined group categories,
        wherein the clustering model includes a hierarchical clustering model that recursively merges communities into a single node and executes modularity clustering on condensed graphs using the similarity scores to generate resulting clusters, and
        wherein the clustering model defines a resulting cluster, of the resulting clusters, that contain less than a particular quantity of skills as a unique cluster to reduce granularity of the clustered anchor skill data; and
    performing, by the device, one or more actions based on the clustered anchor skill data.

2. The method of claim 1, wherein performing the one or more actions comprises one or more of:
    providing the clustered anchor skill data for display;
    identifying and providing for display data identifying a capability of an employee, of the one or more employees, relative to other employees, of the one or more employees; or
    identifying and providing for display data identifying leadership qualities of the employee relative to other employees.

3. The method of claim 1, wherein performing the one or more actions comprises one or more of:
    identifying and providing for display data identifying job opportunities for an employee of the one or more employees;
    identifying and providing for display data identifying the employee as an expert relative to other employees; or
    generating an education plan for the employee to acquire an additional skill or improve an existing skill.

4. The method of claim 1, wherein performing the one or more actions comprises one or more of:
   automatically registering an employee of the one or more employees for one or more courses to acquire an additional skill or improve an existing skill;
   retraining the similarity model based on the clustered anchor skill data; or
   retraining the clustering model based on the clustered anchor skill data.

5. The method of claim 1, further comprising:
   receiving employee data identifying one or more of:
      self-assessed skills,
      completed trainings,
      organizations,
      interests,
      expertise, or
      an education level associated with an employee of the one or more employees; and
   determining the skill data based on the employee data.

6. The method of claim 1, wherein adding or removing the one or more skills to or from the skill data for the predefined target skill profile categories comprises:
   removing, from the skill data, one or more skills that a first predetermined quantity of other employees, of the one or more employees, possess and one or more skills that a second predetermined quantity of other employees, of the one or more employees, do not possess.

7. The method of claim 1, wherein the similarity scores between the skills identified by the skill data are determined based on employee data identifying one or more of self-assessed skills, completed trainings, organizations, interests, expertise, or an education level associated with an employee of the one or more employees.

8. A device, comprising:
   one or more memories; and
   one or more processors, communicatively coupled to the one or more memories, configured to:
      receive employee data identifying one or more of:
         skills,
         completed trainings,
         organizations,
         interests,
         expertise, or
         an education level associated with an employee of one or more employees;
      determine, from the employee data, skill data identifying skills of the employee;
      obtain historical data,
         wherein the historical data is associated with at least one of:
            historical employee data,
            historical skill data,
            historical similarity scores, and/or
            historical groups of anchor skill data;
      obtain, based on the historical data, a set of observations;
      partition the set of observations into a training set;
      train a similarity model and/or a clustering model with the training set;
      process the employee data and the skill data, with the similarity model, to determine similarity scores between the skills identified by the skill data based on the employee data,
         wherein the similarity model includes a cosine similarity on a weighted bipartite graph model;
      add or remove one or more skills to or from the skill data for predefined target skill profile categories, based on the similarity scores and to generate modified skill data,
         wherein the predefined target skill profile categories are based on an expert-defined hierarchy of target skill profiles and skills for an entity,
            wherein the expert-defined hierarchy of target skill profiles and skills for the entity includes:
               a first level corresponding to the entity,
               a second level corresponding to one or more predefined target skill profile categories, and
               a third level corresponding to one or more skills associated with a predefined target skill profile category of the one or more predefined target skill profile categories;
      compare the similarity scores and a predefined threshold to determine anchor skill data from the modified skill data and for each of the predefined target skill profile categories,
         wherein the one or more processors, to compare the similarity scores and the predefined threshold to determine the anchor skill data, are configured to:
            initially define a set of skills having a total similarity score above the predefined threshold as anchor skills,
            selectively add or remove a skill, of the set of skills, based on comparing a weight of the skill, calculated relative to the predefined target skill profile category, to a particular threshold from one or more seeds of the third level, and
            redefine the expert-defined hierarchy based on selecting, adding or removing the skill and based on performing an iterative process to continue to add new skills, of the set of skills, as seeds to the one or more seeds in the third level;
      group the anchor skill data for corresponding pluralities of the predefined target skill profile categories, based on a predefined group category and to generate groups of the anchor skill data;
      process the groups of the anchor skill data and the similarity scores, with the clustering model, to generate clustered anchor skill data for each of the groups of the anchor skill data,
         wherein the clustering model includes a hierarchical clustering model that recursively merges communities into a single node and executes modularity clustering on condensed graphs using the similarity scores to generate resulting clusters, and
         wherein the clustering model defines a resulting cluster, of the resulting clusters, that contain less than a particular quantity of skills as a unique cluster to reduce granularity of the clustered anchor skill data;
      identify one or more job opportunities for the employee based on the clustered anchor skill data; and
      provide data identifying the one or more job opportunities to a client device associated with the employee.

9. The device of claim 8, wherein the anchor skill data includes skills, from the skill data, with similarity scores that satisfy the predefined threshold.

10. The device of claim 8, wherein the one or more processors are further configured to:

generate, based on the clustered anchor skill data, an education plan for the employee to acquire an additional skill or improve an existing skill; and
provide the education plan to the client device associated with the employee.

11. The device of claim 8, wherein the one or more processors are further configured to:
automatically register the employee for one or more courses to acquire an additional skill or improve an existing skill; and
provide, to the client device associated with the employee, information identifying the one or more courses for which the employee is registered.

12. The device of claim 8, wherein the one or more processors, when adding or removing the one or more skills to or from the skill data for the predefined target skill profile categories, are configured to:
add, to the skill data, one or more skills with similarity scores that satisfy a particular threshold; and
remove, from the skill data, one or more skills with similarity scores that fail to satisfy the particular threshold.

13. The device of claim 8, wherein the one or more processors are further configured to:
identify skills in the skill data with similarity scores that are substantially a same as similarity scores of skills in a cluster of the clustered anchor skill data;
determine a similarity ranking for the identified skills in the skill data; and
provide the similarity ranking for display.

14. The device of claim 8, wherein the one or more processors are further configured to:
identify one or more skills in the skills data that are similar to one or more skills in the expert-defined hierarchy;
sum the similarity scores for the identified skills to generate the total similarity score; and
calculate the predefined threshold based on the total similarity score.

15. A non-transitory computer-readable medium storing instructions, the instructions comprising:
one or more instructions that, when executed by one or more processors, cause the one or more processors to:
receive employee data identifying one or more of:
self-assessed skills,
completed trainings,
organizations,
interests,
expertise, or
an education level associated with an employee;
determine, from the employee data, skill data identifying skills of the employee;
obtain historical data,
wherein the historical data is associated with at least one of:
historical employee data,
historical skill data,
historical similarity scores, and/or
historical groups of anchor skill data;
obtain, based on the historical data, a set of observations;
partition the set of observations into a training set;
train a similarity model and/or a clustering model with the training set;
process the employee data and the skill data, with a similarity model, to determine similarity scores between the skills identified by the skill data based on the employee data,
wherein the similarity model includes a cosine similarity on a weighted bipartite graph model;
add or remove one or more skills to or from the skill data for predefined target skill profile categories, based on the similarity scores and to generate modified skill data,
wherein the predefined target skill profile categories are based on an expert-defined hierarchy of target skill profiles and skills for an entity,
wherein the expert-defined hierarchy of target skill profiles and skills for the entity includes:
a first level corresponding to the entity,
a second level corresponding to one or more predefined target skill profile categories, and
a third level corresponding to one or more skills associated with a predefined target skill profile category of the one or more predefined target skill profile categories;
compare the similarity scores and a predefined threshold to determine anchor skill data from the modified skill data and for each of the predefined target skill profile categories,
wherein the one or more instructions, that cause the one or more processors to compare the similarity scores and the predefined threshold to determine the anchor skill data, cause the one or more processors to to:
initially define a set of skills having a total similarity score above the predefined threshold as anchor skills,
selectively add or remove a skill, of the set of skills, based on comparing a weight of the skill, calculated relative to the predefined target skill profile category, to a particular threshold from one or more seeds of the third level, and
redefine the expert-defined hierarchy based on selecting, adding or removing the skill and based on performing an iterative process to continue to add new skills, of the set of skills, as seeds to the one or more seeds in the third level;
group the anchor skill data for corresponding pluralities of the predefined target skill profile categories, based on a predefined group category and to generate groups of the anchor skill data;
process the groups of the anchor skill data and the similarity scores, with the clustering model, to generate clustered anchor skill data for each of the groups of the anchor skill data,
wherein the clustering model includes a hierarchical clustering model that recursively merges communities into a single node and executes modularity clustering on condensed graphs using the similarity scores to generate resulting clusters, and
wherein the clustering model defines a resulting cluster, of the resulting clusters, that contain less than a particular quantity of skills as a unique cluster to reduce granularity of the clustered anchor skill data; and
perform one or more actions based on the clustered anchor skill data.

16. The non-transitory computer-readable medium of claim 15, wherein the one or more instructions, that cause the one or more processors to perform the one or more actions, cause the one or more processors to one or more of:
provide the clustered anchor skill data for display;
identify and provide for display data identifying a capability of the employee relative to other employees;
identify and provide for display data identifying leadership qualities of the employee relative to other employees;
identify and provide for display data identifying job opportunities for the employee;
identify and provide for display data identifying the employee as an expert relative to other employees;
generate an education plan for the employee to acquire an additional skill or improve an existing skill;
automatically register the employee for one or more courses to acquire an additional skill or improve an existing skill;
retrain the similarity model based on the clustered anchor skill data; or
retrain the clustering model based on the clustered anchor skill data.

17. The non-transitory computer-readable medium of claim 15, wherein the one or more instructions, that cause the one or more processors to add or remove the one or more skills to or from the skill data for the predefined target skill profile categories, cause the one or more processors to:
remove, from the skill data, one or more skills that a first predetermined quantity of other employees possess and one or more skills that a second predetermined quantity of other employees do not possess.

18. The non-transitory computer-readable medium of claim 15, wherein the one or more instructions, that cause the one or more processors to perform the one or more actions, cause the one or more processors to:
automatically register the employee for one or more courses to acquire an additional skill or improve an existing skill; and
provide, to a client device associated with the employee, information identifying the one or more courses for which the employee is registered.

19. The non-transitory computer-readable medium of claim 15, wherein the one or more instructions, that cause the one or more processors to add or remove the one or more skills to or from the skill data for the predefined target skill profile categories, cause the one or more processors to:
add, to the skill data, one or more skills with similarity scores that satisfy a particular threshold; and
remove, from the skill data, one or more skills with similarity scores that fail to satisfy the particular threshold.

20. The non-transitory computer-readable medium of claim 15, wherein the one or more instructions, when executed by the one or more processors, further cause the one or more processors to:
identify skills in the skill data with similarity scores that are substantially a same as similarity scores of skills in a cluster of the clustered anchor skill data;
determine a similarity ranking for the identified skills in the skill data; and
provide the similarity ranking for display.

* * * * *